(12) United States Patent
Maehara

(10) Patent No.: US 7,224,263 B2
(45) Date of Patent: May 29, 2007

(54) SECURITY APPARATUS

(75) Inventor: Hiroaki Maehara, Hyogo (JP)

(73) Assignee: Fujitsu Ten Limited, Kobe-shi (JP)

( * ) Notice: Subject to any disclaimer, the term of this patent is extended or adjusted under 35 U.S.C. 154(b) by 131 days.

(21) Appl. No.: 10/774,633

(22) Filed: Feb. 10, 2004

(65) Prior Publication Data
US 2004/0217849 A1 Nov. 4, 2004

(30) Foreign Application Priority Data
Feb. 12, 2003 (JP) ............................. 2003-033231
Mar. 18, 2003 (JP) ............................. 2003-072950

(51) Int. Cl.
*B60R 25/00* (2006.01)
(52) U.S. Cl. ................. 340/429; 340/426.25; 307/10.2
(58) Field of Classification Search ................ 340/429, 340/426.25, 435, 436, 438, 467; 307/10.1–10.3
See application file for complete search history.

(56) References Cited

U.S. PATENT DOCUMENTS

| | | | | |
|---|---|---|---|---|
| 4,845,464 A | * | 7/1989 | Drori et al. .................. 340/429 |
| 5,155,467 A | * | 10/1992 | Matsubara ................... 340/429 |
| 5,216,407 A | * | 6/1993 | Hwang ........................ 340/429 |
| 5,334,969 A | * | 8/1994 | Abe et al. ............... 340/426.26 |
| 5,363,300 A | * | 11/1994 | Lin ............................. 702/141 |
| 5,382,045 A | * | 1/1995 | Takeda et al. ............ 280/5.515 |
| 5,579,230 A | * | 11/1996 | Lin et al. ....................... 701/70 |
| 5,718,446 A | * | 2/1998 | Fuchida ................ 280/124.157 |
| 6,100,792 A | * | 8/2000 | Ogino et al. ............ 340/426.25 |
| 6,148,669 A | * | 11/2000 | Roest ........................ 73/514.31 |
| 6,186,539 B1 | * | 2/2001 | Foo et al. .................... 280/735 |
| 6,452,961 B1 | * | 9/2002 | Van Wechel ................. 375/142 |
| 6,615,122 B1 | * | 9/2003 | Yamashita .................... 701/45 |
| 6,639,511 B2 | * | 10/2003 | Haruna et al. .......... 340/426.13 |
| 6,816,081 B1 | * | 11/2004 | Okada et al. ............. 340/825.5 |
| 6,856,044 B2 | * | 2/2005 | Ries-Mueller ............. 307/10.2 |
| 6,933,839 B2 | * | 8/2005 | Henry ......................... 340/479 |
| 6,940,405 B2 | * | 9/2005 | Script et al. .............. 340/545.1 |
| 2002/0003472 A1 | | 1/2002 | Haruna et al. |
| 2002/0039951 A1 | * | 4/2002 | Hasegawa .................... 477/183 |

FOREIGN PATENT DOCUMENTS

| JP | A 2002-67882 | 3/2002 |
|---|---|---|
| JP | A 2002-245558 | 8/2002 |

* cited by examiner

*Primary Examiner*—Jeffery Hofsass
*Assistant Examiner*—Anne V. Lai
(74) *Attorney, Agent, or Firm*—Oliff and Berridge, PLC

(57) ABSTRACT

An IG key monitor sends out an anti-theft instruction to a GAIN switching part, in case that an IG key SW (ignition key switch) was turned to an OFF state. The GAIN switching part receives the anti-theft instruction from the IG key monitor, and then, switches detection sensitivity of an acceleration sensor to second detection sensitivity (which is detection sensitivity available for inclination judgment of a vehicle, and for example, is approximately ±2 G). An inclination judgment part judges whether or not a vehicle is inclined on the basis of a detection result of the acceleration sensor whose detection sensitivity was switched as described above, and outputs an anti-theft alarm through an alarm part, in case that an output of the acceleration sensor exceeds 0.1 G.

20 Claims, 18 Drawing Sheets

FIG. 5A
| IG KEY | GAIN SWITCHING SW 1 | FILTER SWITCHING SW 2 | FILTER SWITCHING SW 3 | GAIN | CUTOFF FREQUENCY |
|---|---|---|---|---|---|
| ON | OFF | OFF | OFF | ±50G | 200Hz |
| OFF | ON | ON | ON | ±2G | 50Hz |
FIG. 5B
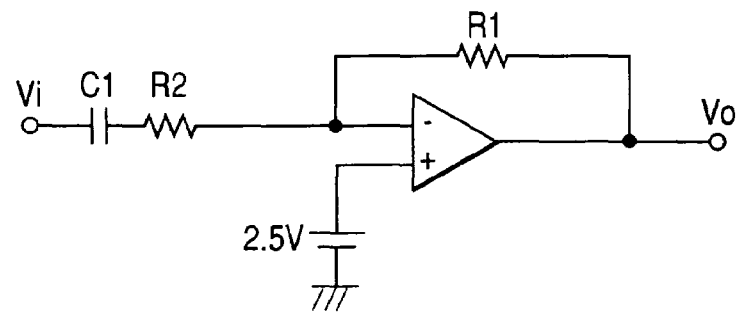
FIG. 5C
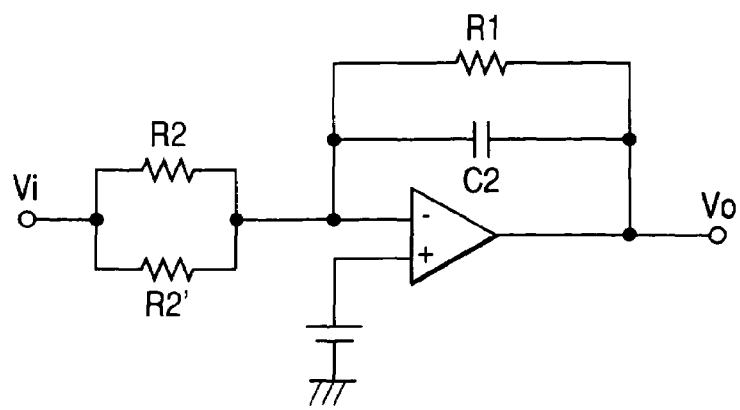

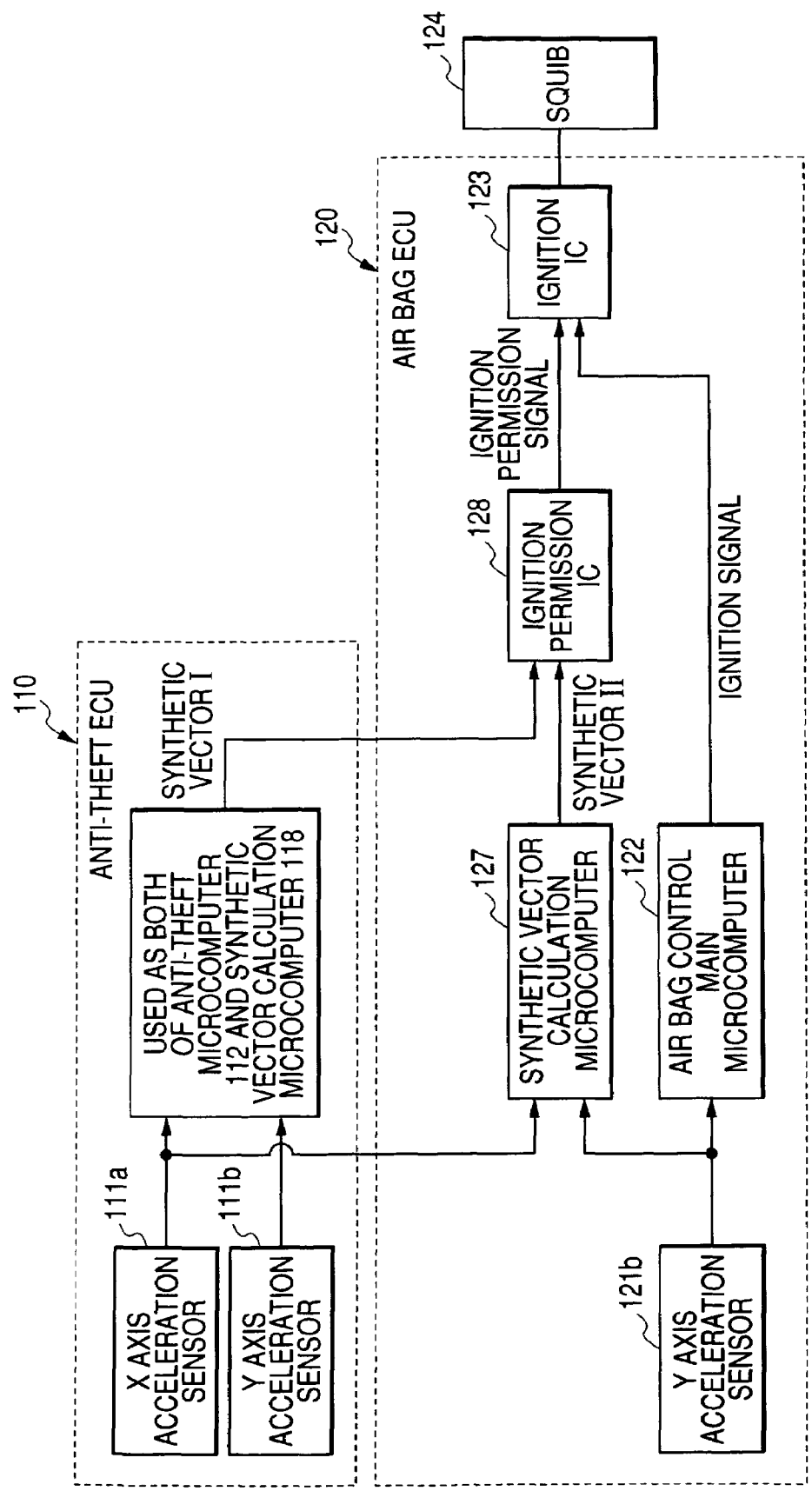

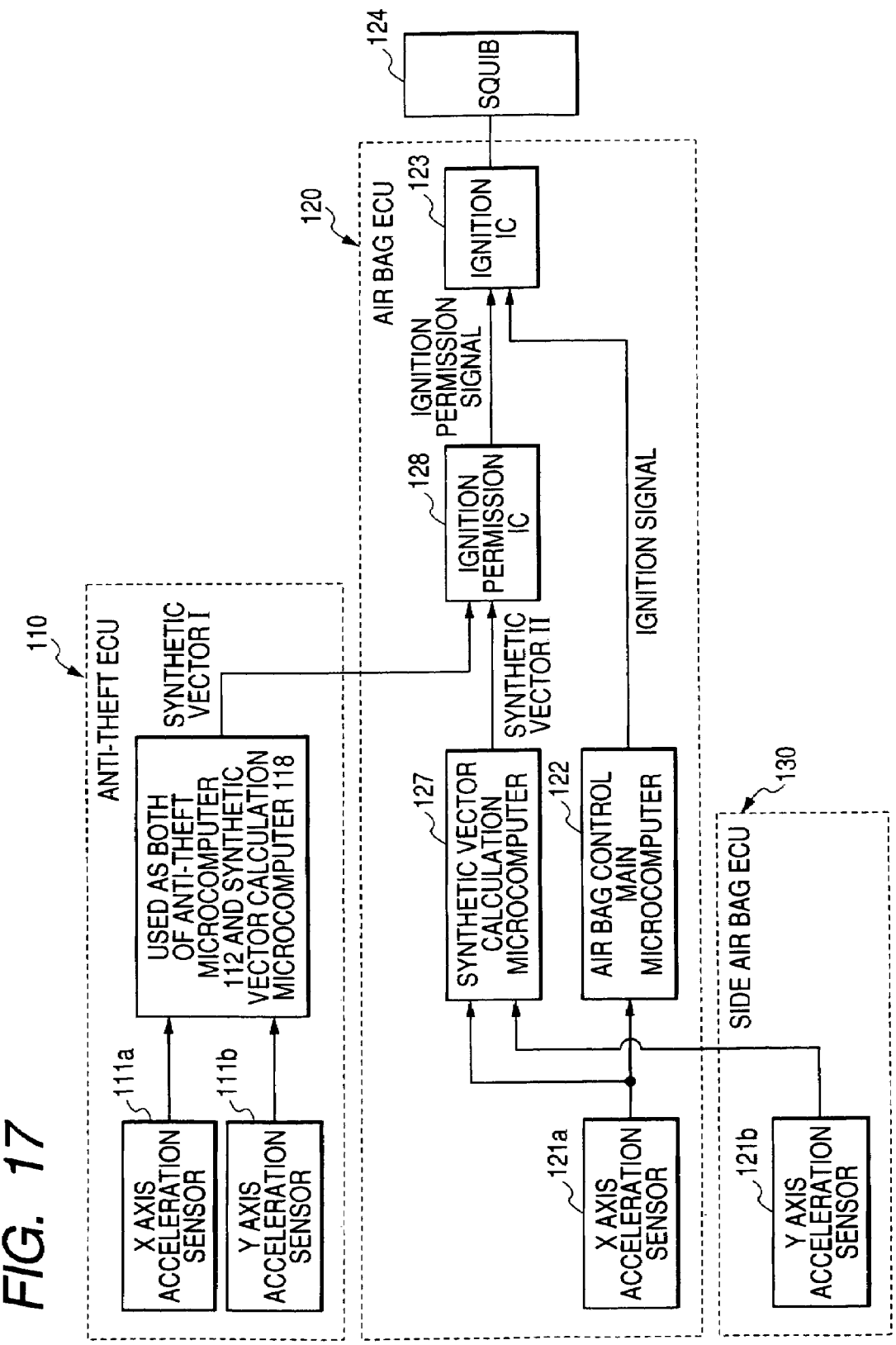

SECURITY APPARATUS

BACKGROUND OF THE INVENTION

1. Field of the Invention

This invention relates to an anti-theft apparatus, an anti-theft method and an anti-theft program which can surely detect a theft state of a vehicle, such as inclination and vibration of a vehicle due to a theft action, even in a case that various acceleration sensors, which are mounted on a vehicle for an application other than anti-theft, are also used for anti-theft.

Also, it relates to an expansion permission apparatus of an air bag, an expansion permission method and an expansion permission program for giving expansion permission on the occasion of expanding an air bag to an air bag apparatus for expanding an air bag on the basis of a detection result of an acceleration sensor, and in particular, relates to an expansion permission apparatus of an air bag, an expansion permission method and an expansion permission program in which, without making a structure of an air bag apparatus complicated by use of an anti-theft apparatus, it becomes possible to configure an electronic safing system at less cost, and which can secure reliability of an air bag operation.

2. Description of the Related Art

In the past, in a vehicle such as an automobile, an auto-bicycle and so on, in order to prevent theft of a parked vehicle and a tire by use of jack-up and so on, there was such a case of mounting anti-theft dedicated ECU (electronic control unit) in which an inclination sensor was incorporated. Further, in recent years, for the purpose of reducing a cost, there has been such a proposal that the anti-theft dedicated ECU is not mounted, but an acceleration sensor inherently mounted on a vehicle for an application other than anti-theft is also used for an application of anti-theft.

For example, in JP-A-2002-67882, disclosed is an anti-theft apparatus in which an inclination sensor (acceleration sensor) for use in detecting reversal which is incorporated in a reversal detection ECU (electronic control unit for detecting reversal of a vehicle to stop fuel injection and ignition) which was mounted on an auto-bicycle is also used for anti-theft. Concretely speaking, it is an anti-theft apparatus in which, by detecting a vibration component of a vehicle by use of the inclination sensor, the inclination sensor is also used as a vibration sensor for use in anti-theft.

However, in case that various acceleration sensors, which are mounted on a vehicle for an application other than anti-theft, are intended to be used also for anti-theft as an inclination sensor from the same view point as above, there was such a problem that it is not necessarily possible to surely detect inclination of a vehicle from a problem of detection sensitivity.

Explaining this concretely, for example, in an air bag ECU (electronic control unit for detecting a mechanical shock from a predetermined direction to have an air bag ignited) which is mounted on a vehicle, an acceleration sensor for detecting the shock is incorporated, but this detection sensitivity is generally set up to approximately ±50 G–±300 G from a view point of shock detection. In other words, to cite an example, detection sensitivity of a Y direction acceleration sensor (see, FIG. 2A) which was disposed in a front collision air bag ECU is approximately ±100 G.

On one hand, in case that a vehicle was inclined due to jack-up and so on, as shown in FIG. 2B, change of acceleration due to gravity which does not normally appear as an output and is applied in a vertical direction appears in an acceleration sensor. And, by utilizing this output change of the acceleration sensor, a relation of "inclination angle—lift amount—acceleration sensor output" as shown in FIG. 2C is logically derived. In addition, the relation shown in FIG. 2C is one on the assumption that a vehicle with vehicle width of 165 cm was inclined due to jack-up and so on.

Here, focusing on a relation which was shown in FIG. 2A, incase that such a state that a vehicle was lifted in a Y direction by approximately 20 cm was assumed to be a critical point for anti-theft, in this state, an output of an acceleration sensor becomes approximately 125 mV, and therefore, in order to surely detect this inclined state from the output of the acceleration sensor, detection sensitivity of approximately ±2 G is required. Therefore, in the acceleration sensor which was cited above as an example, there is necessarily a limit to detect the critical point for anti-theft.

In this manner, even if various acceleration sensors, which are mounted on a vehicle for an application other than anti-theft, are also used for anti-theft as an inclination sensor, detection sensitivity is too much low as it is, and therefore, it is not necessarily possible to surely detect inclination of a vehicle due to jack-up and so on, and it was difficult to surely prevent theft of a vehicle and a tire.

In addition, in the same manner as this, in case that the acceleration sensor is intended to be used for anti-theft as a vibration sensor (i.e., vibration of a vehicle due to a turbulent action which may lead to theft is intended to be detected), vibration generated due to such action is small as compared with vibration at the time of vehicle collision (i.e., detection sensitivity without any modification is too much low), and therefore, it is not necessarily possible to surely detect vibration of a vehicle, and it was difficult to surely prevent theft of a vehicle and a tire.

SUMMARY OF THE INVENTION

In this connection, this invention is one which was made for solving the above-described problem according to a related technology, and aims to provide an anti-theft apparatus, an anti-theft method and an anti-theft program which can surely detect a theft state of a vehicle, such as inclination and vibration of a vehicle due to a theft action, even in case that various acceleration sensors, which are mounted on a vehicle for an application other than anti-theft, are used also for anti-theft.

In order to solve the above-described problem and to accomplish the object, an anti-theft apparatus which relates to an invention of aspect 1 is one mounted on a vehicle for detecting acceleration in a predetermined direction and characterized by being equipped with an acceleration detection unit whose detection result in a first detection sensitivity is used for a predetermined vehicle control, a sensitivity switching unit for switching the detection sensitivity of the acceleration detection unit to a second detection sensitivity which is different from the first detection sensitivity when it received an anti-theft instruction for instructing prevention of theft, and a theft judgment unit for judging whether or not the vehicle is in a theft state on the basis of the detection result of the acceleration detection unit which was switched to the second detection sensitivity by the sensitivity switching unit.

Therefore, according to this invention, it is one which is mounted on a vehicle and which detects acceleration in a predetermined direction, and since it was designed that detection sensitivity of the acceleration detection unit whose detection result in the first detection sensitivity (e.g., it is detection sensitivity at which a mechanical shock for controlling an air bag can be detected, and approximately ±100

G) is used for predetermined vehicle control is switched to the second detection sensitivity (concretely speaking, it is detection sensitivity which is available for theft judgment of a vehicle. For example, it is detection sensitivity at which inclination of a vehicle due to jack-up and so on can be detected, and approximately ±2 G. Or detection sensitivity at which vibration of a vehicle due to a turbulent action which may lead to theft can be detected, and so on), and then, judged is whether or not a vehicle is in the theft state on the basis of the detection result of the acceleration detection unit which was switched to the second detection sensitivity, even in case that various acceleration sensors, which are mounted on a vehicle for an application other than anti-theft, are also used for anti-theft, it becomes possible to surely detect the theft state of a vehicle.

Also, an anti-theft apparatus which relates to an invention of aspect 2 is characterized in that, in the invention as set forth in aspect 1, the sensitivity switching unit switches respective detection sensitivities of a plurality of acceleration detection units which are mounted on the vehicle when it receives the anti-theft instruction, and the theft judgment unit judges whether or not the vehicle is in the theft state on the basis of respective detection results of the plurality of acceleration detection units.

Therefore, according to the invention, since it was designed that respective detection sensitivities of the plurality of acceleration detection units which were mounted on a vehicle are switched in response to reception of the anti-theft instruction, and judged is whether or not a vehicle is in the theft state on the basis of respective detection results of the plurality of acceleration detection units, it is possible to judge the theft state (concretely speaking, inclination or vibration) in multiple aspects by a combination of detection results of the plurality of acceleration detection units and to prevent misjudgment, and it becomes possible to detect the theft state of a vehicle with a high degree of accuracy also, an anti-theft apparatus which relates to an invention of aspect 3 is characterized in that, in the invention as set for thin aspect 2, the theft judgment unit judges that the vehicle is in the theft state, in case that acceleration which was detected by any one of acceleration detection units out of the plurality of acceleration detection units exceeds a predetermined threshold value.

Therefore, according to this invention, since it was designed that it is judged that a vehicle is in a theft state in case that acceleration which was detected by any one of acceleration detection units out of the plurality of acceleration detection units exceeds a predetermined threshold value, it is possible to simply judges the theft state (concretely speaking, inclination or vibration) of a vehicle by the detection result of any one acceleration detection unit, and it becomes possible to detect the theft state of a vehicle as quickly as possible.

Also, an anti-theft apparatus which relates to an invention of aspect 4 is characterized in that, in the invention as set forth in aspect 2, the theft judgment unit judges that the vehicle is in the theft state, in case that respective accelerations which were detected by a plurality of acceleration detection units for detecting acceleration in the same direction out of the plurality of acceleration detection units exceed a predetermined threshold value.

Therefore, according to this invention, since it was designed to judge that a vehicle in a theft state, in case that respective accelerations which were detected by a plurality of acceleration detection units for detecting acceleration in the same direction out of the plurality of acceleration detection units exceed a predetermined threshold value, it is possible to carefully judge a theft state (concretely speaking, inclination or vibration) of a vehicle by detection results of a plurality of acceleration detection units, and it becomes possible to detect the theft state of a vehicle with a high degree of accuracy.

Also, an anti-theft apparatus which relates to an invention of aspect 5 is characterized in that, in the invention as set forth any one of aspects 1 to 4, the theft judgment unit judges whether or not the vehicle is in the theft state on the basis of inclination of the vehicle.

Therefore, according to this invention, since it was designed to judge whether or not a vehicle is in a theft state on the basis of inclination of the vehicle, it becomes possible to surely detect inclination of a vehicle due to jack-up and so on for theft.

Also, an anti-theft apparatus which relates to an invention of aspect 6 is characterized in that, in the invention as set forth in anyone of aspects 1 to 4, the theft judgment unit judges whether or not the vehicle is in the theft state on the basis of vibration of the vehicle.

Therefore, according to this invention, since it was designed to judge whether or not a vehicle is in a theft state on the basis of vibration of the vehicle, it becomes possible to surely detect vibration of the vehicle due to a turbulent action which may lead to theft.

Also, an anti-theft apparatus which relates an invention of aspect 7 is characterized in that, in the invention as set forth in aspect 6, the theft judgment unit judges whether or not the vehicle is in the theft state on the basis of a detection result of an acceleration detection unit which was disposed at an outer edge part of the vehicle.

Therefore, according to this invention, since it was designed to judge whether or not a vehicle is in a theft state on the basis of the detection result of the acceleration detection unit which was disposed at the outer edge part of the vehicle, in case that a theft state which is assumed to be vibration is intended to be detected, vibration which is applied to a vehicle is detected easier at the outer edge part, so that it becomes possible to improve detection accuracy.

Also, an anti-theft apparatus which relates to an invention of aspect 8 is characterized in that the sensitivity switching unit switches each detection sensitivity in such a manner that the second detection sensitivity of the acceleration detection unit which was disposed at a central part of the vehicle becomes higher than the second detection sensitivity of the acceleration detection unit which was disposed at the outer edge part of the vehicle.

Therefore, according to this invention, since it was designed to switch each detection sensitivity in such a manner that the second detection sensitivity of the acceleration detection unit which was disposed at a central part of the vehicle becomes higher than the second detection sensitivity of the acceleration detection unit which was disposed at the outer edge part of the vehicle, it becomes possible to secure detection accuracy at the central part, taking into consideration that vibration which is applied to a vehicle is detected easier at the outer edge part.

Also, an anti-theft apparatus which relates to an invention of aspect 9 is characterized in that, in the invention as set forth in any one of aspects 1 to 8, the acceleration detection unit is an acceleration sensor which was disposed in a front collision air bag ECU, an acceleration sensor which was disposed in a side collision air bag ECU, an acceleration sensor which is used for electronic control suspension and/or an acceleration sensor which is used for a vehicle stability control system.

Therefore, according to this invention, since it was designed to utilize an acceleration sensor which was disposed in a front collision air bag ECU, an acceleration sensor which was disposed in a side collision air bag ECU, an acceleration sensor which is used for electronic control suspension and/or an acceleration sensor which is used for a vehicle stability control system, it is possible to detect a theft state (concretely speaking, inclination or vibration) by an acceleration sensor which is basically fixed to a vehicle stoutly and to which a behavior to the vehicle is directly applied, and thus, it becomes also possible to not only reduce a cost but also to improve detection accuracy, as compared with such a case that an anti-theft dedicated ECU is provided at later time.

Also, an anti-theft apparatus which relates to an invention of aspect 10 further includes, in the invention as set forth in any one of aspects 1 to 9, a noise elimination unit for eliminating noise from the detection result of the acceleration detection unit, and is characterized in that the theft judgment unit judges whether or not the vehicle is in the theft state on the basis of the detection result from which noise was eliminated by the noise elimination unit.

Therefore, according to the invention, since it was designed to eliminate noise from the detection result of the acceleration detection unit, and to judge whether or not a vehicle in a theft state on the basis of the detection result from which noise was eliminated, it is possible to remove a high-frequency noise component (high-frequency noise component according to vibration, which is different from inclination due to jack-up, and electromagnetic wave noise, and so on) which acts as a drag on the occasion of judging a theft state (concretely speaking, inclination or vibration) of a vehicle, and it becomes possible to judge the theft state of the vehicle with a high degree of accuracy.

Also, an anti-theft apparatus which relates to an invention of aspect 11 is characterized in that, in the invention as set forth in aspect 10, the noise elimination unit eliminates the noise by switching a cutoff frequency of a filter which is additionally disposed in the acceleration detection unit to a frequency which corresponded to theft judgment of the vehicle.

Therefore, according to this invention, since it was designed to eliminate noise, by switching a cutoff frequency of a filter which is additionally disposed in the acceleration detection unit to a frequency which corresponded to theft judgment of the vehicle, it becomes possible to simply eliminate a high-frequency noise component, by switching of so-called high-pass and low-pass filer circuits.

Also, an anti-theft apparatus which relates to an invention of aspect 12 is characterized in that, in the invention as set forth in aspect 10, the noise elimination unit eliminates the noise, by periodically integrating the detection result of the acceleration detection unit.

Therefore, according to this invention, since it was designed to eliminate noise by periodically integrating the detection result of the acceleration detection unit, it becomes possible to simply eliminate a high-frequency noise component without using a filter circuit.

Also, an anti-theft apparatus which relates to an invention of aspect 13 is characterized in that, in the invention as set forth in aspect 10, the noise elimination unit eliminates the noise by switching a cutoff frequency of a filter which is additionally disposed in the acceleration detection unit to a frequency which corresponded to theft judgment of the vehicle, and by periodically integrating the detection result of the acceleration detection unit.

Therefore, according to this invention, since it was designed to eliminate noise, by switching a cutoff frequency of a filter which is additionally disposed in the acceleration detection unit to a frequency which corresponded to theft judgment of the vehicle, and by periodically integrating the detection result of the acceleration detection unit, it becomes possible to simply and surely eliminate a high-frequency noise component, by simultaneous use of a filter circuit and periodical integration.

Also, an anti-theft apparatus which relates to an invention of aspect 14 is characterized in that, in the invention as set forth in any one of aspects 1 to 13, the acceleration detection unit is contained in a predetermined unit together with various devices, and power is supplied thereto from a battery which was mounted on the vehicle or a dry battery which was contained in the predetermined unit, in the same manner as in the various devices, and further includes a power supply control unit for controlling the power source only to the acceleration detection unit in the predetermined unit, and the theft judgment unit judges whether or not the vehicle is in the theft state on the basis of the detection result of the acceleration detection unit which was controlled so as to supply the power source by the power supply control unit.

Therefore, according to this invention, since it was designed to control so as to supply power only to an acceleration detection unit in a predetermined unit, in response to an anti-theft instruction, in case of utilizing an acceleration detection unit which is contained in a predetermined unit together with various devices, and to which power is supplied, in the same manner as various devices, from a battery which was mounted on a vehicle or a dry battery which was contained in the predetermined unit, and to judge whether or not a vehicle is in a theft state on the basis of the detection result of the acceleration detection unit which was controlled so as to supply the power source, it becomes possible to surely detect the theft state (concretely speaking, inclination or vibration) of a vehicle, in addition to effectively using power of the battery or the dry battery.

Also, an anti-theft apparatus which relates to an invention of aspect 15 is characterized in that, in the invention as set forth in aspect 14, the power supply control unit controls so as to intermittently supply the power source from the battery or dry battery to the acceleration detection unit.

Therefore, according to this invention, since it was designed to control so as to intermittently supply the power source to the acceleration detection unit from the battery or dry battery, it is possible to more reduce consumption of the battery or dry battery, and it becomes possible to more effectively use power of the battery or dry battery.

Also, an anti-theft apparatus which relates to an invention of aspect 16 is characterized in that, in the invention as set forth in aspect 14 or 15, the power supply control unit controls so as to stop supply of the power source to the acceleration detection unit, in case that a voltage of the battery or dry battery became a predetermined voltage and below.

Therefore, according to this invention, since it was designed to control so as to stop supply of the power source to the acceleration detection unit, in case that a voltage of the battery or dry battery became a predetermined voltage and below, it becomes possible to urgently avoid consumption of the battery or dry battery, so as to secure power to a portion which is indispensable for a vehicle.

Also, an anti-theft apparatus which relates to an invention of aspect 17 further includes, in the invention as set forth in any one of aspects 1 to 16, a monitoring unit for monitoring a state of the vehicle and for sending out the anti-theft instruction, and is characterized in that the sensitivity switching unit switches detection sensitivity of the acceleration detection unit to detection sensitivity which is available for theft judgment of the vehicle, when it receives the anti-theft instruction which was sent out by the monitoring unit.

Therefore, according to this invention, since it was designed to monitor a state of a vehicle and to send out an anti-theft instruction, and to switch detection sensitivity of the acceleration detection unit to detection sensitivity which is available for theft judgment of the vehicle, in response to the anti-theft instruction which was sent out, it becomes possible to properly send out the anti-theft instruction in accordance with such a state that the vehicle is parked and so on, and to switch the detection sensitivity always at appropriate timing.

Also, an anti-theft apparatus which relates to an invention of aspect 18 is characterized in that, in the invention as set forth in aspect 17, the monitoring unit monitors an ON-OFF state of an ignition key, and sends out the anti-theft instruction, in case that the ignition key was turned to the OFF state.

Therefore, according to this invention, since it was designed to monitor the ON-OFF state of the ignition key and to send out the anti-theft instruction in case that the ignition key was turned to the OFF state, it is possible to automatically send out the anti-theft instruction, assuming that the OFF state of the ignition key is deemed to be a parked state of the vehicle, and it becomes possible to switch the detection sensitivity always at appropriate timing, without necessity of a special operation for anti-theft by a driver.

Also, an anti-theft method which relates to an invention of aspect 19 is characterized by including an acceleration detection step of detecting acceleration in a predetermined direction, a result of the detection in a first detection sensitivity being used for a predetermined vehicle control, a sensitivity switching unit of switching the detection sensitivity of the acceleration detection step to a second detection sensitivity which is different from the first detection sensitivity when an anti-theft instruction for instructing prevention of theft was received, and a theft judgment step of judging whether or not the vehicle is in a theft state on the basis of the detection result of the acceleration detection step which was switched to the second detection sensitivity by the sensitivity switching step.

Therefore, according to this invention, since it was designed that acceleration of a vehicle in a predetermined direction is detected, and detection sensitivity of the acceleration detection step whose detection result in the first detection sensitivity (e.g., it is detection sensitivity at which a mechanical shock for controlling an air bag can be detected, and approximately ±100 G) is used for predetermined vehicle control is switched to the second detection sensitivity (concretely speaking, it is detection sensitivity which is available for theft judgment of a vehicle. For example, it is detection sensitivity at which inclination of a vehicle due to jack-up and so on can be detected, and approximately ±2 G. Or detection sensitivity at which vibration of a vehicle due to a turbulent action which may lead to theft can be detected, and so on), and then, in case that acceleration which was switched to the second detection sensitivity and detected in the acceleration detection step exceeds the predetermined threshold value, it was judged is that the vehicle is in the theft state, even in case that various acceleration sensors, which are mounted on a vehicle for an application other than anti-theft, are also used for anti-theft, it becomes possible to surely detect the theft state of a vehicle.

Also, an anti-theft program which relates to an invention of aspect 20 is characterized by having a computer executed an acceleration detection step of detecting acceleration in a predetermined direction, a result of the detection in a first detection sensitivity being used for a predetermined vehicle control, a sensitivity switching unit of switching the detection sensitivity of the acceleration detection step to a second detection sensitivity which is different from the first detection sensitivity when an anti-theft instruction for instructing prevention of theft was received, and a theft judgment step of judging whether or not the vehicle is in a theft state on the basis of the detection result of the acceleration detection step which was switched to the second detection sensitivity by the sensitivity switching step.

Therefore, according to this invention, since it was designed that acceleration of a vehicle in a predetermined direction is detected, and detection sensitivity of the acceleration detection step whose detection result in the first detection sensitivity (e.g., it is detection sensitivity at which a mechanical shock for controlling an air bag can be detected, and approximately ±100 G) is used for predetermined vehicle control is switched to the second detection sensitivity (concretely speaking, it is detection sensitivity which is available for theft judgment of a vehicle. For example, it is detection sensitivity at which inclination of a vehicle due to jack-up and so on can be detected, and approximately ±2 G. Or detection sensitivity at which vibration of a vehicle due to a turbulent action which may lead to theft can be detected, and so on), and then, in case that acceleration which was switched to the second detection sensitivity and detected in the acceleration detection step exceeds the predetermined threshold value, it was judged is that the vehicle is in the theft state, even in case that various acceleration sensors, which are mounted on a vehicle for an application other than anti-theft, are also used for anti-theft, it becomes possible to surely detect the theft state of a vehicle.

Also, an invention which relates to aspect 21 is an expansion permission apparatus of an airbag for giving expansion permission to an air bag apparatus for expanding an air bag on the basis of a detection result of an acceleration detection unit on the occasion of expanding the air bag, and includes an expansion permission judgment unit for judging whether or not expansion of the air bag is permitted on the basis of a detection result of a predetermined acceleration detection unit, the unit using an electronic component which is provided in a control device disposed in a vehicle for carrying out predetermined control which is different from air bag control, and is characterized in that the predetermined control is control unnecessary to be operated, on the occasion that there is a necessity for carrying out the air bag control.

According to this invention, it is different control from air bag control and uses an electronic component which is provided in a control device disposed in a vehicle for carrying out predetermined control unnecessary to be operated, on the occasion that there is a necessity for carrying out the air bag control, and judges whether or not expansion of an air bag is permitted on the basis of a detection result of a predetermined acceleration detection unit. Therefore, since expansion permission of the air bag is carried out, not by newly mounting a logic IC and a microcomputer on an air bag ECU, but by utilizing a logic IC and a microcomputer which have been already mounted in a separate device other than the air bag ECU, without making a structure of an air bag apparatus complicated, it becomes possible to configure an electronic safing system at less cost, and it becomes possible to secure reliability of an air bag operation.

Here, in case that the electronic safing system is configured by use of a separate device other than the air bag ECU, air bag expansion judgment requires high-speed judgment, whereas if it is configured that the another device carries out original control of the device and control of the air bag expansion judgment in a parallel manner, there is such a risk that processing may be delayed by use of an in-car low-end CPU. Therefore, in the suchlike case, by applying the another device which carries out predetermined control which is control unnecessary to be operated on the occasion that there is a necessity of carrying out the air bag control, it becomes possible to avoid the above-described problem, and to configure an electronic safing system which does not cause delay of processing.

BRIEF DESCRIPTION OF THE DRAWINGS

These and other objects and advantages of this invention will become more fully apparent from the following detailed description taken with the accompanying drawings in which:

FIGS. 5A to 5C are views for illustrating detection sensitivity switching and filter switching;

FIG. 16 is a view for illustrating one example in case of carrying out judgment of expansion permission by utilizing a synthetic vector as another embodiment other than the first and second embodiments;

FIG. 17 is a view for illustrating one example in case of carrying out judgment of expansion permission by utilizing a synthetic vector as another embodiment other than the first and second embodiments.

DETAILED DESCRIPTION OF THE PREFERRED EMBODIMENTS (First Embodiment)

Hereinafter, with reference to the accompanying drawings, as a first embodiment, a preferred embodiment of an anti-theft apparatus, an anti-theft method and an anti-theft program which relate to this invention will be described in detail. In addition, in the following, after an overview and a feature of an anti-theft apparatus which relates to this invention is described, a structure and process procedures of this anti-theft apparatus will be described, and finally, as other embodiments, various modifications will be described.

(Overview and Features of Anti-Theft Apparatus)

Figure 1:
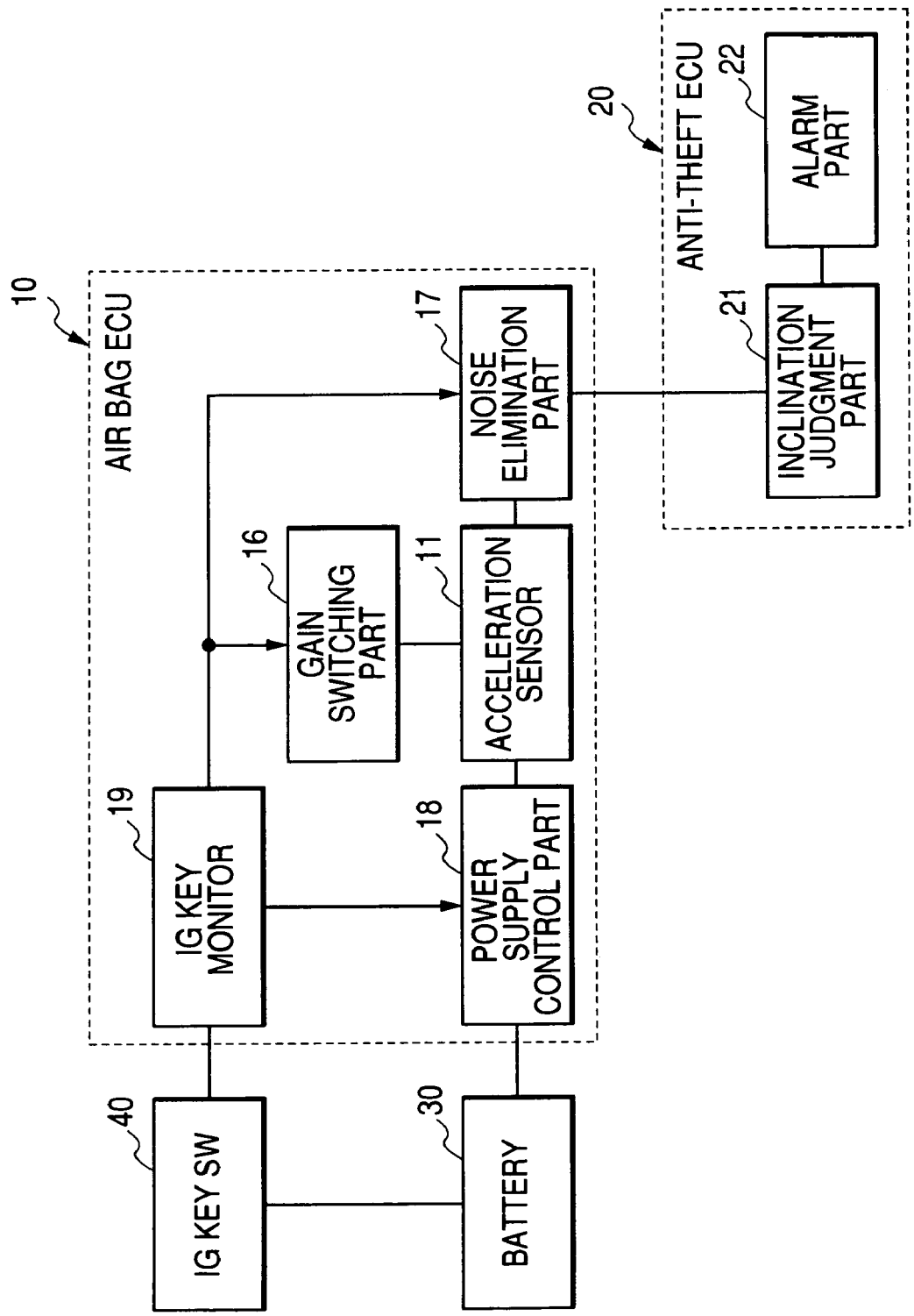
FIG. 1 is a view showing a functional conceptual schematic structure of an anti-theft apparatus which relates to a first embodiment.

At the beginning, an overview and features of the anti-theft apparatus which relates to this invention will be described. FIG. 1 is a view showing a functional conceptual schematic structure of the anti-theft apparatus which relates to this invention. As shown in the same figure, this anti-theft apparatus, schematically, is one which uses an acceleration sensor 11 which is incorporated in an air bag ECU 10 (electronic control unit for detecting a mechanical shock from a predetermined direction to ignite an air bag) which was mounted on a vehicle, as an inclination sensor, and which prevent theft of a vehicle and a tire due to jack-up and so on.

Figure 2A:
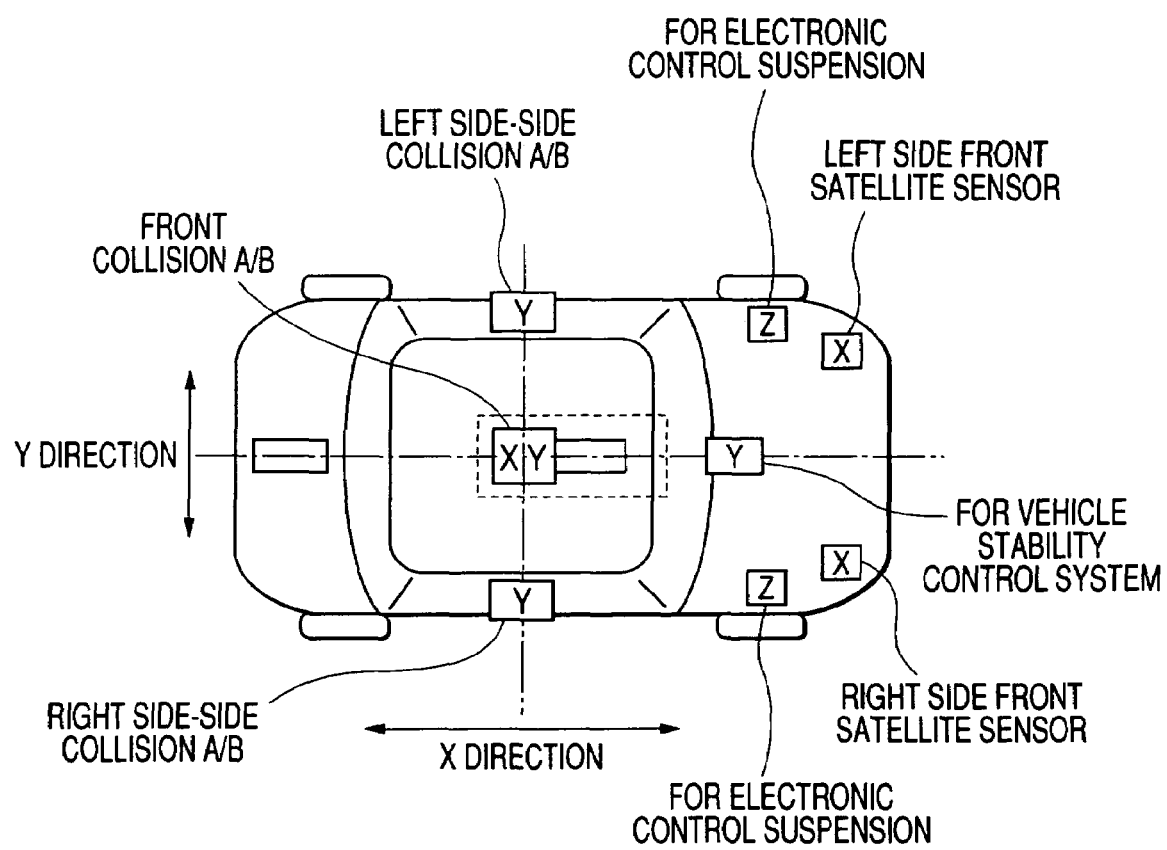
FIGS. 2A to 2C are views for illustrating detection sensitivity of an acceleration sensor which is mounted on a vehicle.

In other words, as shown in FIG. 2A, various acceleration sensors are mounted on a vehicle, and, in the anti-theft apparatus which relates to this invention, in case that a vehicle is parked, a detection result of the acceleration sensor 11 which was disposed in the air bag ECU 10 for use in front collision is outputted to an anti-theft ECU 20. And, in an inclination judgment part of this anti-theft ECU 20, inclination of a vehicle is judged on the basis of the detection result of the acceleration sensor 11, and in case that the vehicle is being inclined to such extent that theft due to jack-up is assumed, an anti-theft alarm is outputted through an alarm part 22.

In this manner, the anti-theft apparatus which relates to this embodiment is one which intends to prevent theft due to jack-up and so on by utilizing the acceleration sensor 11 which was disposed in the air bag ECU 10, but a main feature of this anti-theft apparatus is on such a point that, even in case that an acceleration sensor which is mounted on a vehicle for an application other than anti-theft is also used for anti-theft, like the acceleration sensor 11 of the air bag ECU 10, it is possible to surely detect inclination of a vehicle due to jack-up and so on.

Describing this concretely, in case of a Y direction acceleration sensor (see, FIG. 2A) which was disposed in the front collision air bag ECU 10, its detection sensitivity is set up to approximately ±100 G from the view point of shock detection. On the other side, when assumed is such a state that a vehicle with vehicle width of 165 cm is lifted in a Y direction by approximately 20 cm due to jack-up and so on, since an output of the acceleration sensor 11 in this state becomes approximately 125 mv (see, FIGS. 2(b) and (c)), in order to surely detect this inclination state, detection sensitivity of approximately ±2 G is required.

In shirt, detection sensitivity which is required on the occasion of anti-theft (detection of inclination of a vehicle due to jack-up and soon) (approximately ±2 G) is remarkably high as compared with detection sensitivity which is necessary for detecting a shock (approximately ±10 G). Therefore, in case that such a state that a vehicle was lifted in a Y direction by approximately 20 cm was assumed to be a critical point for anti-theft, even if the acceleration sensor 11 is intended to be used for anti-theft as an inclination sensor, since detection sensitivity is too much low as it is, it is not necessarily possible to surely detect inclination of a vehicle due to jack-up and so on.

In this connection, in this embodiment, a GAIN switching part 16 of the air bag ECU 10 switches detection sensitivity of the acceleration sensor 11 to detection sensitivity which is available for theft judgment (inclination judgment) of a vehicle (approximately ±2 G), and an inclination judgment part 21 of the anti-theft ECU 20 judges whether or not a vehicle is in a theft state (whether or not a vehicle is being inclined due to a theft action) on the basis of a detection result of the acceleration sensor 11 which was switched to the such detection sensitivity. That is, by this, it is designed to be able to surely detect inclination of a vehicle due to jack-up and so on. In addition, in FIG. 1, the acceleration sensor 11, the GAIN switching part 16 and the inclination judgment part 21 correspond to "acceleration detection unit", "sensitivity switching unit" and "theft judgment unit", respectively.

Also, the anti-theft apparatus which relates to this embodiment is one which has also additionally features as recited in the following with regard to the above-described main feature. In other words, in this embodiment, in alignment with the above-described switching of detection sensitivity, a noise elimination part 17 of the air bag ECU 10 switches a cutoff frequency of a filter which is additionally disposed in the acceleration sensor 11 from 200 Hz to approximately 50 Hz. That is, by this, it is designed to be able to eliminate a high-frequency noise component (high-frequency noise component according to vibration, which is different from inclination due to jack-up, and electromagnetic wave noise, and so on) which acts as a drag on the occasion of judging inclination of a vehicle from the detection result of the acceleration sensor 11, and to be able to judge inclination of the vehicle with a high degree of accuracy. In addition, in FIG. 1, the noise elimination part 17 corresponds to "noise elimination unit".

Also, in this embodiment, in alignment with the above-described switching of detection sensitivity, a power supply control part 18 of the air bag ECU 10 switches power source supply so as to supply power from a battery 30 only to the acceleration sensor 11 in the air bag ECU 10 (i.e., stops power source supply to another devices such as a CPU which is originally incorporated in the air bag ECU 10 and which performs a function while driving, and so on). That is, by this, it is designed to be able to surely detect inclination of a vehicle, in addition to effectively using power of the battery 11. In addition, in FIG. 1, the power supply control part 18 corresponds to "power supply unit".

Further, in this embodiment, an IG key monitor 19 of the air bag ECU 10 monitors an ON-OFF state of an IG key SW (ignition key switch) 40, and in case that it was turned to the OFF state, an anti-theft instruction is sent out to the noise elimination part 17 and the power supply control part 18, to have switching of detection sensitivity, switching of a filter and switching of power supply executed, respectively. That is, by this, it is designed to automatically send out the anti-theft instruction, assuming that the OFF state of the IG key SW 40 is deemed to be a parked state of a vehicle, and to always switch detection sensitivity always at appropriate timing, without necessity of a special operation for anti-theft by a driver. In addition, in FIG. 1, the IG key monitor 19 corresponds to "monitoring unit".

(Structure of Anti-Theft Apparatus)

Figure 2B:
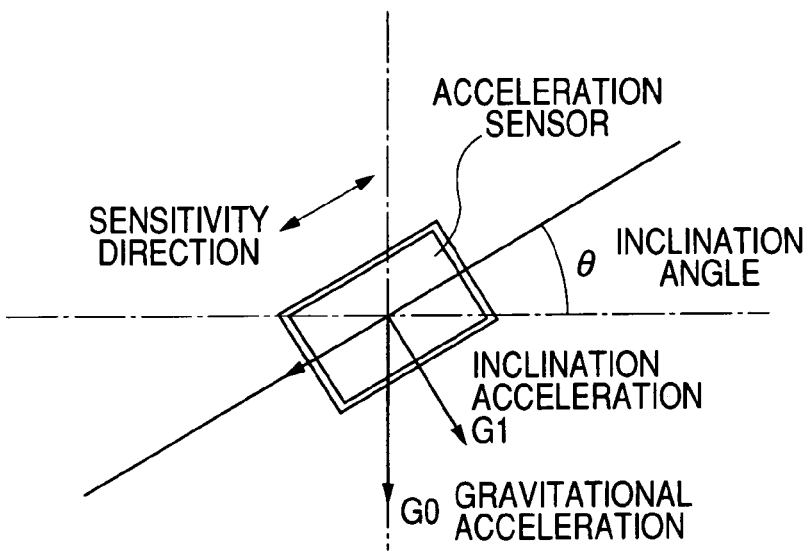
Figure 2C:
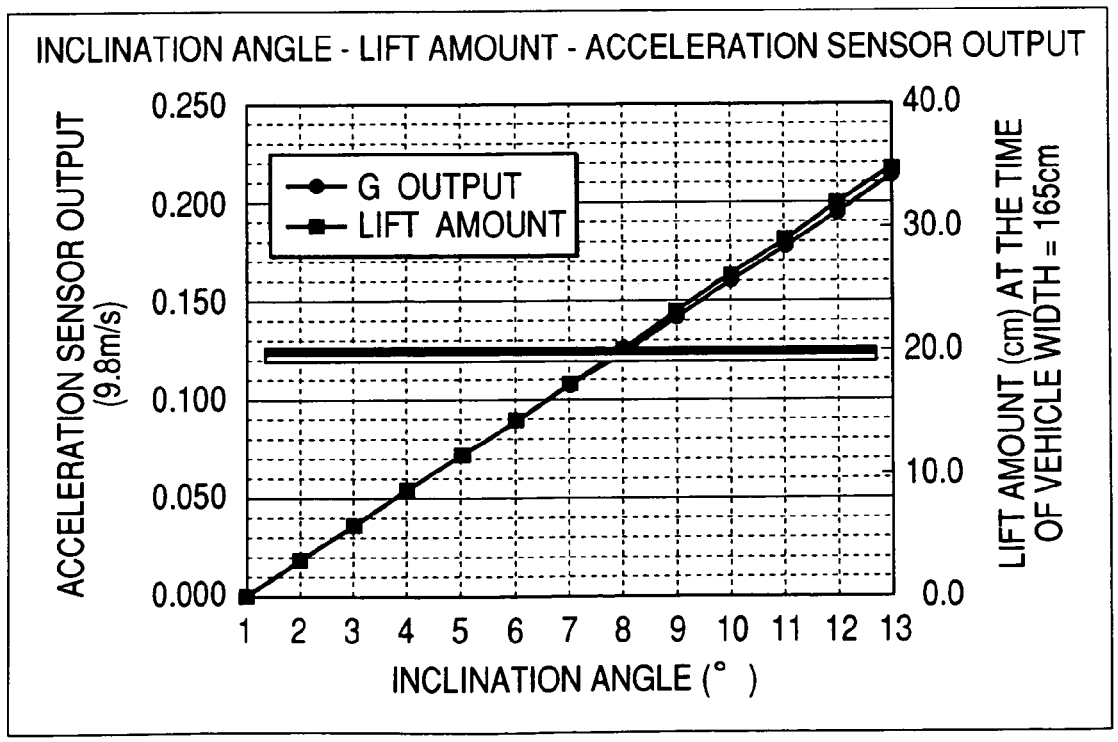

Next, a structure of the anti-theft apparatus which relates to this embodiment will be described. FIGS. 2A to 2C are block diagrams showing a structure of the anti-theft apparatus which relates to this embodiment. As shown in the same figure, this anti-theft apparatus is configured by connecting the air bag ECU 10 and the anti-theft ECU 20, and, in the following, after (1) a structure of the air bag ECU 10 and (2) a structure of the anti-theft ECU 20 will be described, respectively, (3) a structure of a peripheral circuit of the acceleration sensor 11 will be described.

(1) Air Bag ECU

The air bag ECU 10 is basically an electronic control unit for detecting shocks from a front direction and a lateral direction, when a vehicle is in operation (in case that the IG key SW 40 is in the ON state) as the front collision air bag ECU 10 (see, FIG. 1(a)) to ignite an air bag. And, as its basic structure, as shown in FIG. 3, it is equipped with X direction acceleration sensor 11a and Y direction acceleration sensor 11b (correspond to the acceleration sensor 11 shown in FIG. 1), a CPU 12, and a backup power source 13, an ASIC 14, a 5V power source 18c, and a boosting power source 18d.

That is, in this air bag ECU 10, in case that the IG key SW 40 is in the ON state, from the X direction acceleration sensor 11a and Y direction acceleration sensor 11b (hereinafter, these are referred to acceleration sensor 11 at pleasure) for detecting respective accelerations in the X direction and Y direction, detection results are inputted to the CPU 12. And, the CPU 12 judges whether or not there occurred a shock due to collision of a vehicle from that detection result, and in case that the suchlike shock was detected, by a squib 15 (processing part for having chemicals (inflator), which generates nitrogen system gas, burnt) through the ASIC 14, it is controlled to blow up the bag instantaneously.

In addition, in FIG. 3, the 5V power source 18c is means for carrying out voltage conversion in order to obtain a voltage of ±5V from an input voltage (battery 30 or backup power source 13), and the backup power source 13 is means for boosting the input voltage through the boosting power source 18d, in case that a voltage of the battery 30 became a allowable value and below, and for supplying a power source to each acceleration sensor 11, the CPU 12 and the ASIC 14.

Figure 3:
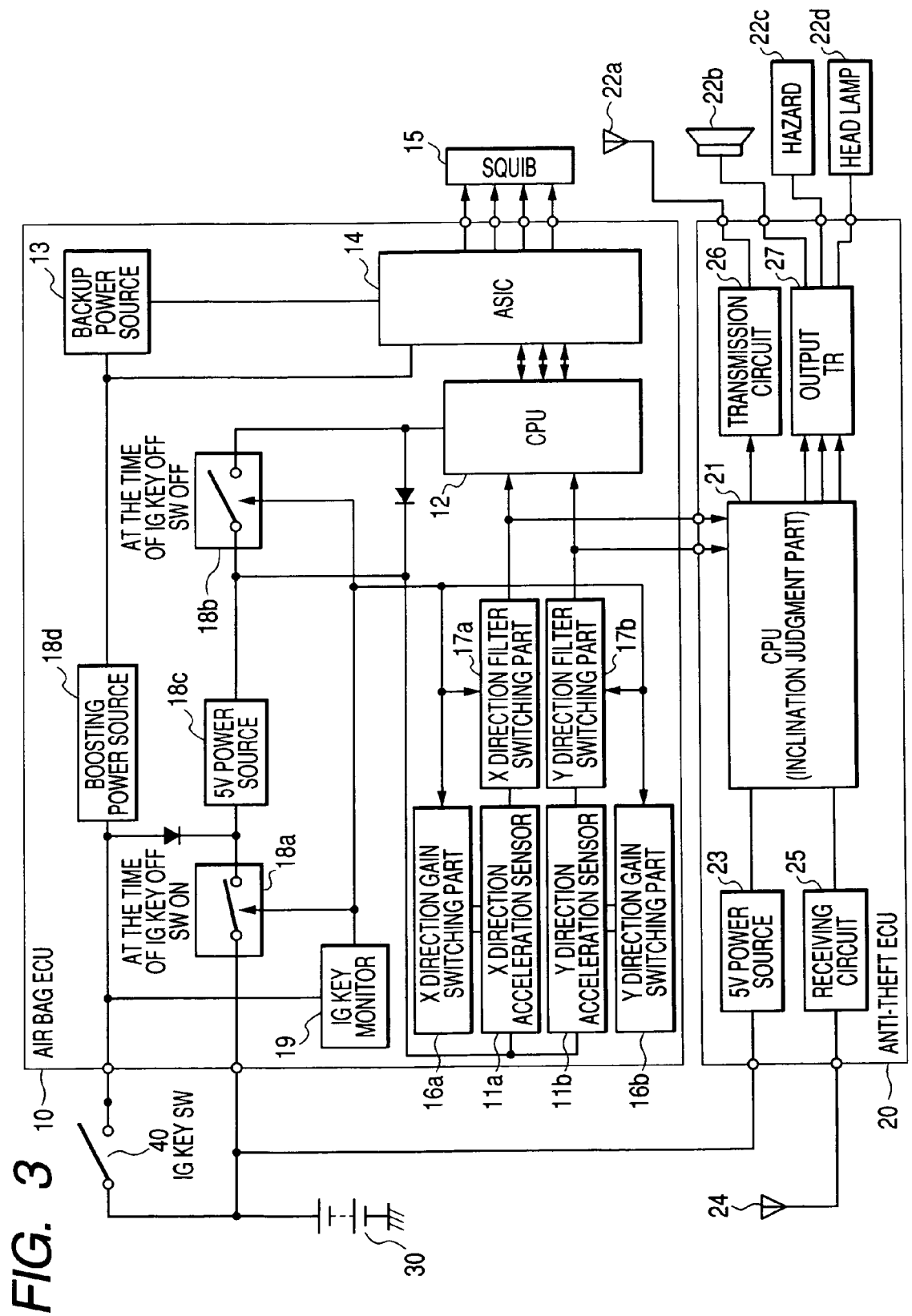
FIG. 3 is a block diagram showing a structure of the anti-theft apparatus which relates to the first embodiment.

On one hand, the air bag ECU 10 is, other than the suchlike basic structure, as a structure which relates to the above-described feature, as shown in FIG. 3, equipped with a X direction GAIN switching part 16a and a Y direction GAIN switching part 16b (correspond to the GAIN switching part 16 shown in FIG. 1), a X direction filter switching part 17a and a Y direction filter switching part 17b (correspond to the noise elimination part 17 shown in FIG. 1), a power supply control SW 18a and a power supply control SW 18b (correspond to the power supply control part 18 shown in FIG. 1), and an IG key monitor 19. A structure which relates to these features will be described.

The X direction GAIN switching part 16a and Y direction GAIN switching part 16b (hereinafter, these are referred to as GAIN switching part 16 at pleasure) is a processing part which receives an anti-theft instruction from the IG key monitor 19, and which switches detection sensitivity of each acceleration sensor 11 to detection sensitivity which is available for inclination judgment. Concretely speaking, with regard to the X direction acceleration sensor 11a, it switches detection sensitivity which was set up to approximately ±50 G from the viewpoint for detecting a shock to approximately ±2 G, and with regard to the Y direction acceleration sensor 11b, it switches detection sensitivity which was set up to approximately ±100 G in the same manner to detection sensitivity of approximately ±20 G. As a result, after the IG key SW 40 was turned to the OFF state, an acceleration sensor output of the acceleration sensor 11 is outputted to the anti-theft ECU 20 with resolution of approximately ±2 G. In addition, this switching of the detection sensitivity will be described later as "(3) Structure of Peripheral Circuit of Acceleration Sensor".

The X direction filter switching part 17a and Y direction filter switching part 17b (hereinafter, these are referred to as noise elimination part 17 at pleasure) is a processing part which receives an anti-theft instruction from the IG key monitor 19, and which switches a cutoff frequency of a filter in order to eliminate high-frequency noise from detection result of each acceleration sensor 11. Concretely speaking, it switches the filter from high-pass of approximately 200 Hz (low-cut) to low-pass of approximately 50 Hz (high-cut). In addition, this switching of the filter will be also described later as "(3) Structure of Peripheral Circuit of Acceleration Sensor".

The power supply control SW18a and the power supply control SW18b (hereinafter, these are referred to as power supply control part 18 at pleasure) is a processing part which receives the anti-theft instruction from the IG key monitor 19, and which switches power supply so as to supply power from the battery 30 only to the acceleration sensor 11 in the air bag ECU 10. Concretely speaking, as shown in FIG. 3, in case that the IG key SW 40 was turned to the OFF state, receiving the anti-theft instruction from the IG key monitor 19, the power supply control SW 18a is turned to the "ON" state and the power supply control SW 18b is turned to the "OFF" state, and as a result of that, power supply to the CPU 12 and so on is stopped, and power is supplied only to the acceleration sensor 11.

The IG key monitor 19 is a processing part which monitors the ON/OFF states of the IG key SW 40, and which, in case that the IG key SW 40 was turned to the OFF state, sends out the anti-theft instruction to the GAIN switching part 16, the noise elimination part 17 and the power supply control part 18. In addition, in case that the IG key SW 40 was turned to the ON state, it sends out an anti-theft release instruction to each part, and switches each to such a state that a vehicle is in operation.

(2) Anti-Theft ECU

Subsequently, a structure of the anti-theft ECU 20 will be described, but this anti-theft ECU 20 is, as shown in FIG. 3, equipped with a 5V power source 23, a receiving circuit 25, a transmission circuit 26, and an output TR 27, and a emergency notification transmission antenna 22a, a siren 22b, a hazard lamp 22c, a head lamp 22d, and a security receiving antenna 24 are connected thereto.

Here, the CPU 21 (corresponds to the inclination judgment part 21 shown in FIG. 1) is a processing part which judges whether or not a vehicle is in a theft state (concretely speaking, whether or not it is inclined), on the basis of a detection result of the acceleration sensor 11 in the air bag ECU 10. Concretely speaking, it judges whether or not a detection result in the X direction acceleration sensor 11a or the Y direction acceleration sensor 11b exceeds a threshold value (e.g., 0.1 G) In addition, this threshold value is a threshold value in case of surely detecting such a state that a vehicle with vehicle width of 165 cm was lifted by 20 cm and more, and since resolution of a microcomputer A/D is 10 bit (1024LSB) and 1LSB=4 mG is realized, 0.1 G (25LSB) is made to be a detection threshold value.

And, the CPU (inclination judgment part) 21 carries out the following alarm action in case that the detection result of the acceleration sensor 11 exceeds the threshold value. That is, alarm siren is sounded from the siren 22b through the output TR 27, and the hazard lamp 22c and/or the head lamp 22d are made to be flashed, and further, an emergency situation is notified to an owner from the emergency notification antenna 22a through the transmission circuit 26.

In addition, the CPU 21 receives ON/OFF of security from the security receiving antenna 24 through the receiving circuit 25, and changes a function of the anti-theft ECU 20 to the OFF state, in case that the anti-theft ECU 20 is not desired to be operated for various circumstances such as repair of a vehicle, tow of a vehicle, and soon. Also, the anti-theft ECU 20 receives supply of a power source from the battery 30 through the 5V power source 23 for carrying out voltage conversion for obtaining a voltage of ±5V from the input voltage, and is operated.

(3) Structure of Peripheral Circuit of Acceleration Sensor

Figure 4:
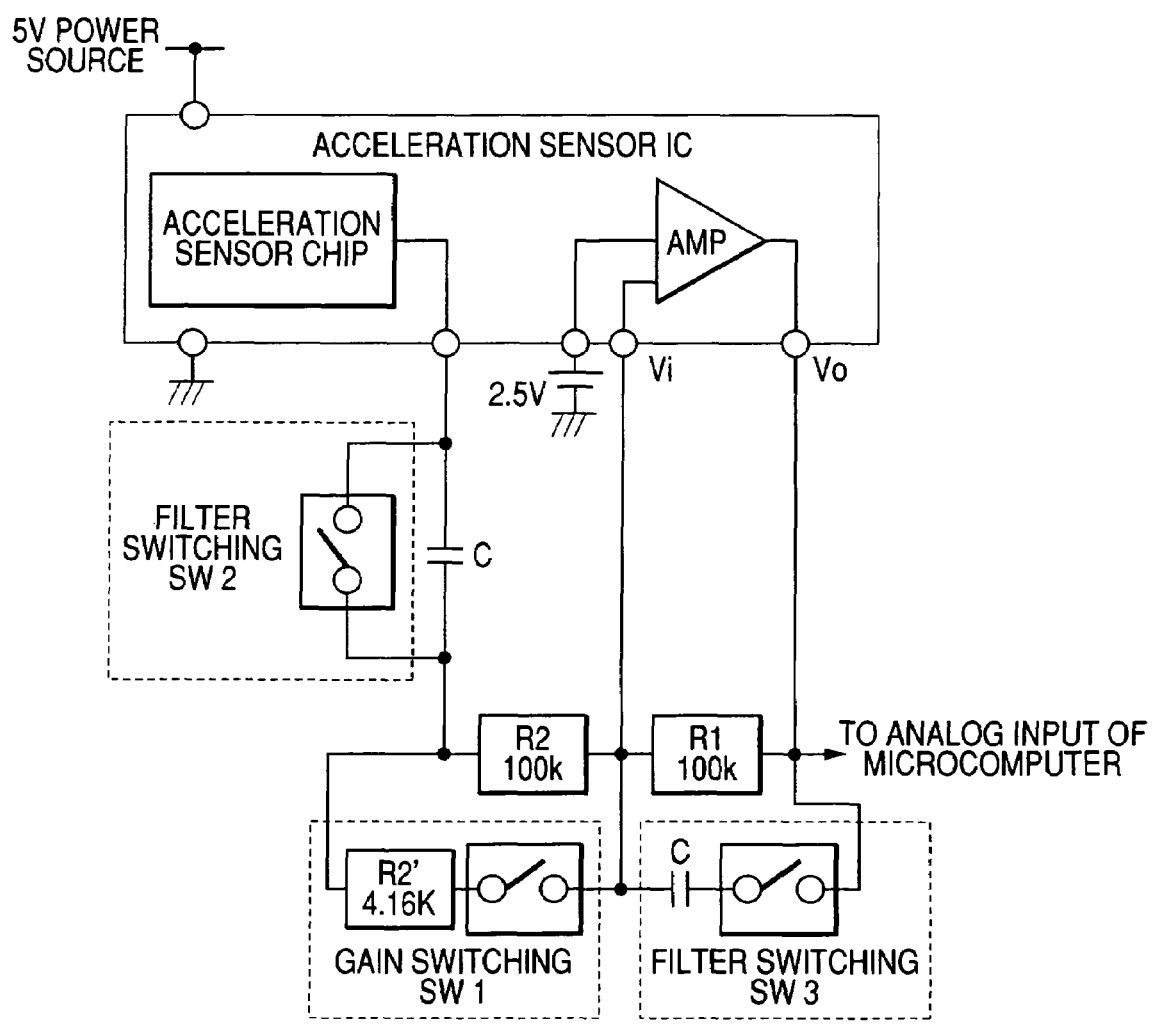
FIG. 4 is a view showing a structure of a peripheral circuit of the acceleration sensor.

Subsequently, a structure of a peripheral circuit of the acceleration sensor 11 will be clarified, and then, detection sensitivity switching and filter switching will be described. FIG. 4 is a view showing a structure of a peripheral circuit of the acceleration sensor, and FIG. 5A to 5C are views illustrating the detection sensitivity switching and filter switching.

As shown in FIG. 4, in an acceleration sensor IC in which an acceleration sensor chip and an AMP (amplifier) were incorporated, an output terminal of the acceleration sensor chip is connected to an input terminal of a microcomputer (CPU 12 or CPU 21 shown in FIG. 3) through a capacitor C1, a resistor R2 (100K) and a resistor R1 (100k). Also, in the AMP (amplifier) of the acceleration sensor IC, a reference power source 2.5V is connected to a plus side input terminal, and also, a minus side input terminal (Vi) is connected to connection terminals of the resistors R1 and R2, and an output terminal (Vo) is connected to an input terminal of a microcomputer. Further, as shown in the same figure, a filter switching SW 2 is parallel-connected to the capacitor C1, and a resistor 2' and a GAIN switching SW 1 are parallel-connected to the resistor R2, and a capacitor C2 and a filter switching SW 3 are parallel-connected to the resistor R1.

In the suchlike circuit structure, in case that the IG key SW 40 is in the ON state, as shown in FIG. 5A, by control of the IG key monitor 19, the GAIN switching SW 1, the filter switching SW 2 and the filter switching SW 3 are all turned to the OFF state. And, in this case, since a circuit shown in FIG. 4 becomes a structure shown in FIG. 5B (i.e., Vo=−(Vi−2.5)R1/R2 is realized.), GAIN becomes approximately ±50 G, and a cutoff frequency of a filter becomes 200 Hz (high-pass).

In case that the IG key SW 40 was turned to the OFF state from the suchlike state, receiving the anti-theft instruction from the IG key monitor 19, the GAIN switching SW 1, the filter switching SW 2 and the filter switching SW 3 are all turned to the ON state. And, in this case, since a circuit shown in FIG. 4 becomes a structure shown in FIG. 5C (i.e., Vo=−(Vi−2.5)R1/R3, R3=R2×R2'(R2+R2') are realized.), GAIN is switched to approximately ±2 G, and a cutoff frequency of the filter becomes 50 Hz (low-pass).

(Process Procedure of Anti-Theft Apparatus)

Figure 6:
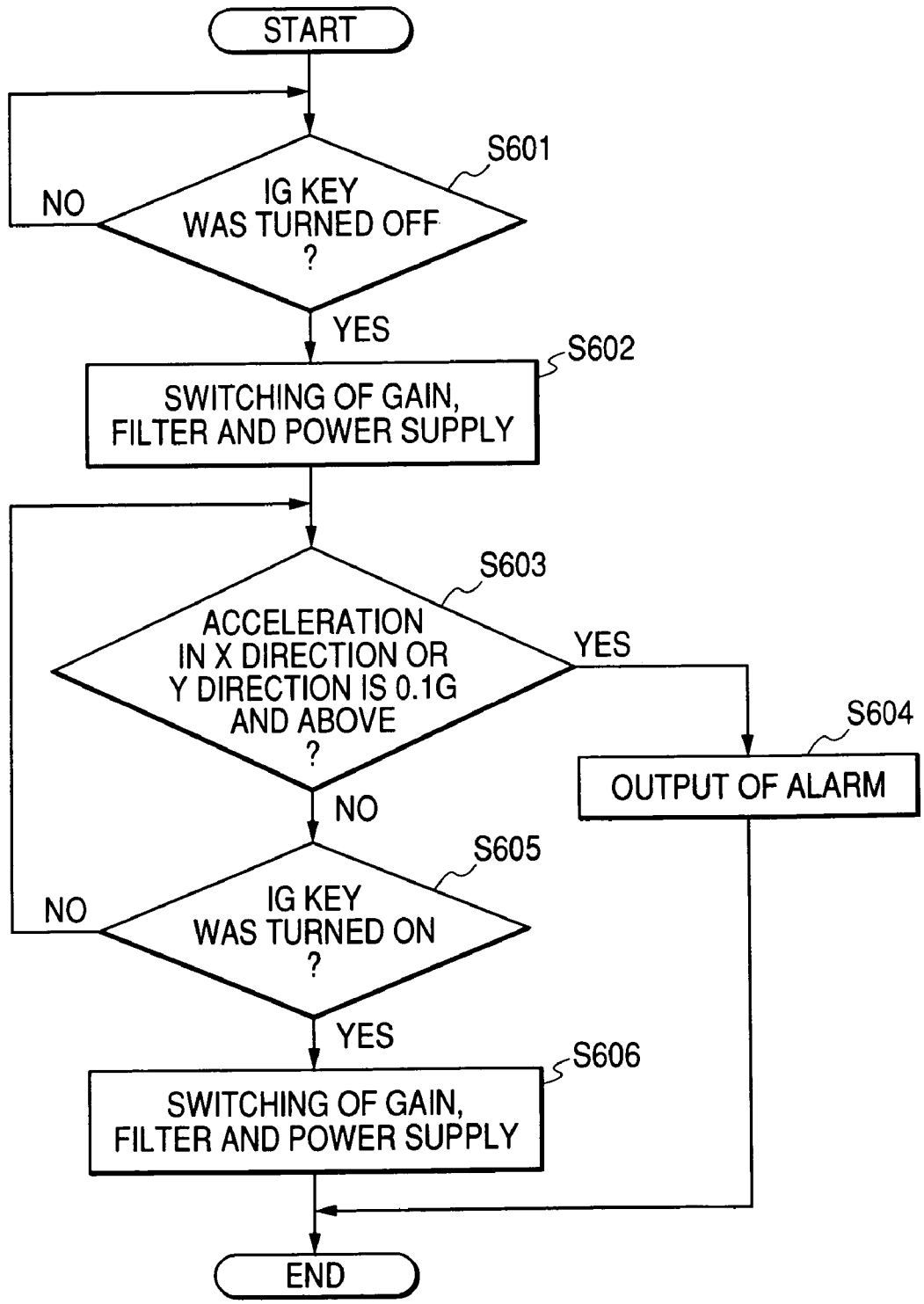
FIG. 6 is a flow chart showing process procedures of the anti-theft apparatus which relates to the first embodiment.

Next, process procedures of the anti-theft apparatus which relates to this embodiment will be described. FIG. 6 is a flow chart showing process procedures of the anti-theft apparatus which relates to this embodiment. As shown in the same figure, the IG key monitor 19 of the air bag ECU 10 repeatedly monitors whether or not the IG key SW 40 was turned to the OFF state (step S601).

And, in case that the IG key SW 40 was turned to the OFF state (affirmative in the step S601), the IG key monitor 19 sends out the anti-theft instruction to the GAIN switching part 16, the noise elimination part 17 and the power supply control part 18, and has switching of detection sensitivity (GAIN), switching of the filter and switching of power supply executed, respectively (step S602). That is, detection sensitivity of the acceleration sensor 11 is switched to approximately ±2 G, and also, the filter is switched to low-pass (high-cut) of approximately 50 Hz, and further, power supply is switched so as for the power source to be supplied only to the acceleration sensor 11.

Subsequently, the inclination judgment part 21 successively judges whether or not a detection result of the acceleration sensor 11 exceeds a threshold value (e.g., 0.1 G) (step S603), and further, the IG key monitor 19 successively monitors whether or not the IG key SW 40 was turned to the ON state (step S605). As a result, in case that the detection result of the acceleration sensor 11 is exceeding the threshold value (affirmative in the step S603), the inclination judgment part 21 outputs alarm through the siren 22b, the hazard lamp 22c, the head lamp 22d and/or emergency notification antenna 22a (step S604).

On one hand, in case that the IG key SW 40 was turned to the ON state (affirmative in the step S605), the IG key monitor 19 sends out an anti-theft release instruction to the GAIN switching part 16, the noise elimination part 17 and the power supply control part 18, and switches each to such a state that a vehicle is in operation (step S606). That is, detection sensitivity of the acceleration sensor 11 is switched to approximately ±100 G, and also, the filter is switched to high-pass (low-cut) of approximately 200 Hz, and further, power supply is switched so as for the power source to be supplied to the CPU 12 and so on other than the acceleration sensor 11.

As described above, according to the anti-theft apparatus which relates to this embodiment, even in case that the acceleration sensor 11 of the air bag ECU 10 which is mounted on a vehicle for an application other than anti-theft is also used for anti-theft, it becomes possible to surely detect inclination of a vehicle due to jack-up and so on. In addition, since it is possible to detect the inclination by an acceleration sensor which is basically fixed to a vehicle stoutly and to which a behavior to the vehicle is directly applied, it becomes possible to not only reduce a cost but also to improve detection accuracy, as compared with such a case that an anti-theft dedicated ECU (electronic control unit) is provided at later time.

Also, according to the anti-theft apparatus which relates to this embodiment, since it is possible to eliminate a high-frequency noise component which acts as a drag on the occasion of judging inclination of a vehicle, it becomes possible to judge the inclination of the vehicle with a high degree of accuracy. Also, it becomes possible to surely detect inclination of a vehicle, in addition to effectively using power of the battery 11. Further, since it is possible to automatically send out the anti-theft instruction, assuming the OFF state of the IG key SW 40 to be such a state that a vehicle is in operation, it becomes possible to switch the detection sensitivity and so on always at appropriate timing, without necessity of a special operation for anti-theft by a driver.

(Other Embodiment)

In the meantime, up to this, the embodiments of this invention were described, but this invention, other than the above-described embodiments, may also be carried out by various different embodiments. In this connection, in the following, different embodiments will be described by separating into (1) structure, (2) acceleration sensor, (3) noise elimination, (4) power supply, (5) anti-theft instruction, and (6) vibration of a vehicle, respectively.

(1) Structure

In this embodiment, described was such a case that structures which relates to features of this invention, like the GAIN switching part 16, the noise elimination part 17, the power supply control part 18 and the IG key monitor 19 are mounted on the air bag ECU 10, but this invention is not limited to this, and is also applicable in the same manner to, for example, such a case that all or a part of these structures are mounted on a part other than the air bag ECU 10, such as these structures being mounted on the anti-theft ECU 20, and so on. In the same manner as this, each structural element of the anti-theft apparatus shown in FIGS. 1 and 3 is functional conceptual one, and it is not necessarily required that it is configured physically as shown in the figure, and it is possible to configure it by functionally or physically dispersing/integrating all or a part of them with an arbitrary unit, according to a processing load, a manufacturing state, a use state and so on.

Further, a circuit structure and an ON/OFF theory of the anti-theft apparatus shown in FIGS. 3 and 4 are not limited to ones shown in the figures, but maybe configured by another circuit and theory which perform similar functions. Also, in the same manner as this, with regard to each processing function which is carried out in the anti-theft apparatus which relates to this embodiment, all or an arbitrary part of them may be realized by a CPU and a program which is analytically executed by the CPU, or may be realized as hardware according to wired logic.

Also, it is possible to automatically carry out all or apart of processing (e.g., switching of detection sensitivity, switching of a filter, switching of a power source, and so on) which was described as one which is automatically carried out, out of each processing which is carried out in the anti-theft apparatus which relates to this embodiment. Further, it is possible to arbitrarily change process procedures, control procedures and concrete names which were shown in the above text and figures, and information including various data and parameters (e.g., threshold value of inclination judgment, GAIN value, cutoff frequency, resistor value, and so on) except for a specified case.

(2) Acceleration Sensor

In this embodiment, described was such a case that both of the X direction acceleration sensor 11a and the Y direction acceleration sensor 11b which were incorporated in the front collision air bag ECU 10 are also used for anti-theft, but this invention is not limited to this, and is also applicable in the same manner to such a case that only one direction inclination judgment is carried out by only one of these (e.g., Y direction acceleration sensor 11b).

Also, in this embodiment, described was such a case that the acceleration sensor which was incorporated in the front collision air bag ECU 10 is also used for anti-theft, but this invention is not limited to this, and is applicable in the same manner to any acceleration sensor which was mounted on a vehicle. That is, as shown in FIG. 2A, on a vehicle, an acceleration sensor which was disposed in a side collision air bag ECU (right side-side collision Y direction acceleration sensor, left side-side collision Y direction acceleration sensor), an acceleration sensor which was disposed in a front collision front satellite sensor (left side-front collision X direction acceleration sensor, right side-front collision X direction acceleration sensor), a Z direction acceleration sensor which is used in an electronic control suspension, and a Y direction acceleration sensor which is used in a vehicle stability control system are mounted, but these acceleration sensors may be also used for anti-theft in the same manner. In addition, even in case that these acceleration sensors are also used for anti-theft, its detection sensitivity is switched to approximately ±2 G, but a threshold value of inclination judgment may be differentiated with respect to each acceleration sensor according to its mounting position.

Also, in this invention, a plurality of acceleration sensors as described above may be also used for anti-theft, and inclination of a vehicle may be judged on the basis of each detection result. That is, to cite an example, it is a combination such as the left side-front collision X direction acceleration sensor and/or the right side-front collision X direction acceleration sensor and, the right side-side collision Y direction acceleration sensor and/or the left side-side collision acceleration sensor. By this, it is possible to judge the inclination in multiple aspects by a combination of detection results of the plurality of acceleration sensors and to prevent misjudgment, and it becomes possible to detect inclination of a vehicle with a high degree of accuracy.

Also, in case that the plurality of acceleration sensors are also used for inclination judgment as described above, it is possible to judge that a vehicle is inclined, when a detection result of any one acceleration sensor exceeds the threshold value. That is, to cite an example, in case that the Y direction acceleration sensor $11b$, the right side-side collision acceleration sensor and the left side-side collision Y direction acceleration sensor in the front collision air bag ECU 10 are also used for inclination judgment, if any one detection result exceeds the threshold value, an alarm action will be carried out. By this, it is possible to simply judge the inclination of a vehicle on the basis of a detection result of any one acceleration sensor, and it becomes possible to promptly detect inclination of a vehicle.

Further, in case that a plurality of same direction acceleration sensor are also used for inclination judgment as described above, it may be possible to judge on such a condition that all of respective detection results exceed the threshold value. That is, speaking on the above-described example, in case that all detection results of the Y direction acceleration sensor $11b$, the right side-side collision Y direction acceleration sensor, and the left side-side collision Y direction acceleration sensor exceeded the threshold value, an alarm action is carried out for the first time. By this, it is possible to carefully detect inclination of a vehicle on the basis of detection results of the plurality of acceleration sensors, and it becomes possible to detect inclination of a vehicle with a high degree of accuracy.

(3) Noise Elimination

In this embodiment, described was such a case that noise is eliminated by a filter, but this invention is not limited to this, and is also applicable in the same manner to every noise elimination methods, such as, for example, periodical integration of a detection result of an acceleration sensor. That is, it is possible to simply eliminate a high-frequency noise component by periodical integration and so on, without using a filter circuit.

Also, in this invention, it becomes possible to simply and surely eliminate a high-frequency noise component, not only by use of noise elimination by a filter but also by simultaneous use of noise elimination according to periodical integration as described above. In addition, also in case of adopting the noise elimination by periodical integration, in the same manner as switching of a cutoff frequency of a filter (switching of low-pass and high-pass), a band of noise which is an object to be eliminated is switched.

(4) Power Supply

In this embodiment, described was such a case that power is supplied from the battery 30 of a vehicle, but this invention is not limited to this, and is also applicable in the same manner to such a case that power is supplied from other part than the battery 30, such as power being supplied from a dry battery which was mounted on the air bag ECU 10 and the anti-theft ECU 20, and so on. In addition, even in case that power is supplied from the dry battery which was mounted on the air bag ECU 10 and the anti-theft ECU 20, it is controlled so as to supply power only to the acceleration sensor, in response to the anti-theft instruction.

Also, in this invention, in case that power is supplied only to the acceleration sensor in the OFF state of the IG key SW 40, it may be controlled so as to intermittently supply power. That is, by this, it is possible to further reduce consumption of the battery and dry battery, and it becomes possible to surely detect inclination of a vehicle, in addition to effectively using power of the battery or the dry battery.

Further, in this invention, in case that a voltage of the battery or the dry battery becomes a predetermined voltage and below, as well as intermittent supply of power, it may be controlled so as to stop supply of power to the acceleration sensor. That is, by this, it becomes possible to urgently avoid consumption of the battery or dry battery, and to secure power to a portion which is indispensable for a vehicle.

(5) Anti-Theft Instruction

In this embodiment, described was such a case that the IG key monitor 19 monitors the ON/OFF states of the IG key SW 40 to send out the anti-theft instruction to the GAIN switching part 16 and so on, but this invention is not limited to this, and is also applicable in the same manner to such a case that another state other than the IG key SW 40 (e.g., a drive state of an engine, a state of other switch and device, and so on) is monitored to send out the anti-theft instruction.

Also, in this invention, it may be designed to dispose a dedicated SW like an anti-theft instruction switch in a vehicle, and to send out the anti-theft instruction after the suchlike dedicated SW was operated so as to be turned ON. Furthermore, it may also be designed to combine this with the IG key SW 40, and to send out the anti-theft instruction after the ON operation of the dedicated SW and the OFF state of the IG key SW 40 were waited.

(6) Vibration of Vehicle

In this embodiment, described was such a case that the acceleration sensor is also used as an inclination sensor, and theft of a vehicle and a tire due to jack-up and so on is prevented, but this invention is not limited to this, and is also applicable in the same manner to such a case that the acceleration sensor is also used as an inclination sensor, and theft is prevented by detecting vibration of a vehicle due to a turbulent action which may lead to theft.

That is, in this case, in order to judge whether or not a vehicle is in a theft state (concretely speaking, whether or not a turbulent action which may lead to theft is carried out), judged is whether or not a vehicle is vibrated on the basis of acceleration which is the detection result of the acceleration sensor 11. And, also in this case, in the same manner as the above-described embodiment, since vibration which is generated by the suchlike action is smaller as compared with vibration at the time of vehicle collision (i.e., detection sensitivity is too much low as it is, so as to be able to surely detect vibration of a vehicle, detection sensitivity of the acceleration sensor 11 is switched to detection sensitivity which is available for vibration detection of a vehicle. In this regard, however, since inclination and vibration of a vehicle are of different actions which are targeted to be detected, used are ones whose concrete values are different from the above-described detection sensitivity and threshold value described above.

Also, in case of vibration judgment of a vehicle, it is desirable to judge whether or not a vehicle is in a theft state on the basis of a detection result of an acceleration sensor (e.g., a front sensor, a side collision sensor, and so on) which was disposed at an outer edge part of a vehicle. In other words, since vibration which is applied to a vehicle is detected easier at the outer edge part, by this, it becomes possible to improve detection accuracy.

Further, in case of vibration judgment of a vehicle, it is desirable to switch each detection sensitivity in such a manner that detection sensitivity of the acceleration sensor which was disposed at a central part of a vehicle (e.g., front collision sensor, and so on) becomes higher than detection sensitivity of the acceleration sensor which was disposed at the outer edge part of the vehicle. In other words, by this, it becomes possible to secure detection accuracy at the central part, taking into consideration that vibration which is applied to a vehicle is detected easier at the outer edge part. In addition, from the same view point as this, in case of vibration judgment of a vehicle, used are threshold values for vibration judgment which differ respectively according to a difference of a position of an acceleration sensor.

In addition, also in case of vibration judgment of a vehicle, the features of this application, which were described in the above-described embodiment and other embodiments (1)–(5) such as switching a cutoff frequency of a filter and switching power supply and so on in alignment with switching of detection sensitivity, is applicable in the same manner.

Finally, the anti-theft method which was described in this embodiment can be realized by executing a program which was provided in advance on a computer (including an external computer) which was mounted on a vehicle. This program can be distributed through a network such as Internet and so on. Also, this program can be executed by being recorded on a computer-readable recording medium such as a hard disc, a flexible disc (FD), a CD-ROM, a MO, a DVD and so on, and by being read out from the recording medium by a computer.

(Second Embodiment)

Hereinafter, with reference to the accompanying drawings, as a second embodiment, a preferred embodiment of an expansion permission apparatus, an expansion permission method of an air bag, and an expansion permission program will be described in detail. In addition, in the following, the embodiment is of such a case that this invention was applied to an anti-theft ECU and an air bag ECU, and an outline and features of the such embodiment will be described firstly, and after that, a structure and process procedures of this anti-theft ECU and the air bag ECU which relate to this embodiment will be described, and finally, as other embodiments, various modifications will be described.

(Overview and Features of this Embodiment)

Figure 7:
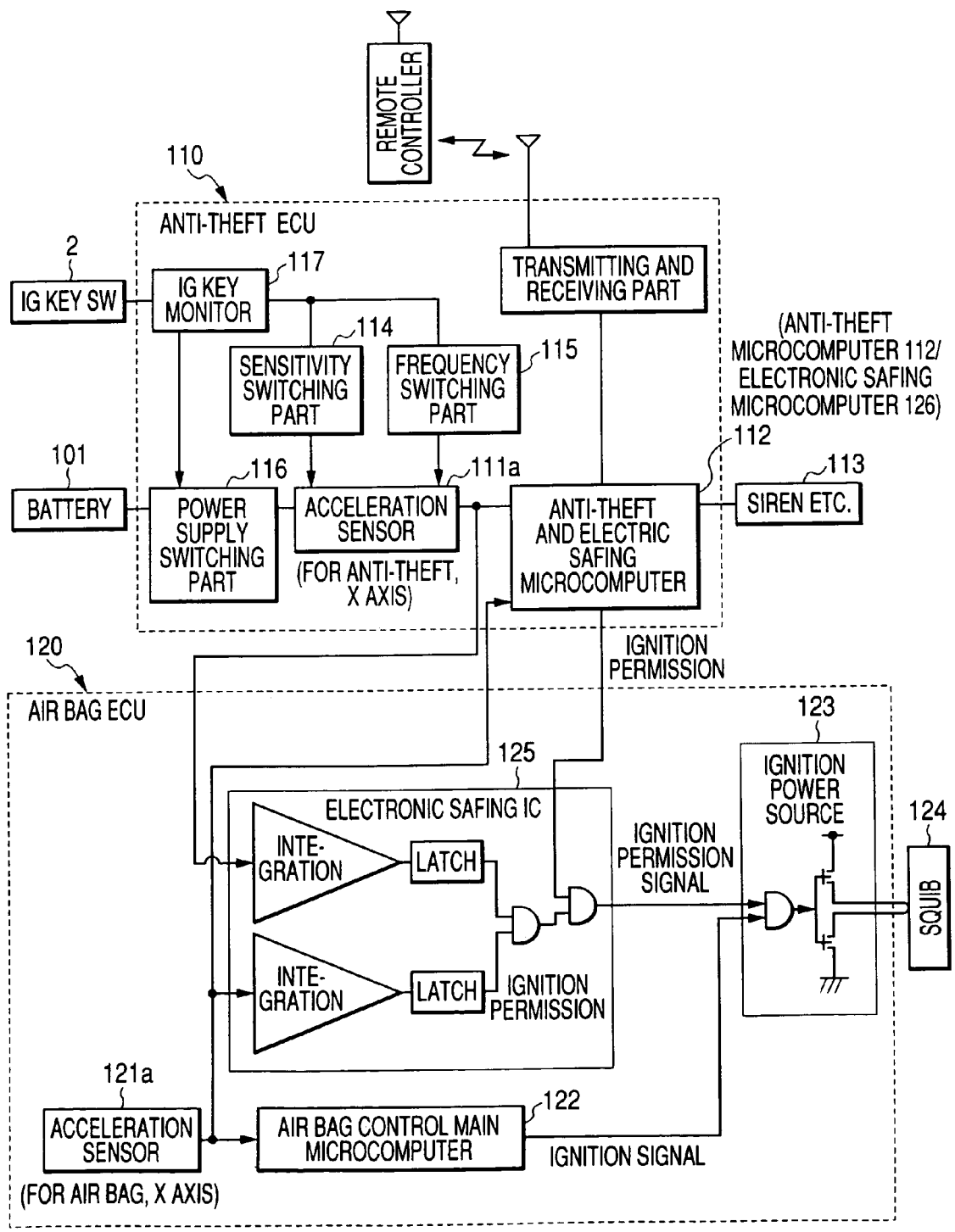
FIG. 7 is a block diagram showing an anti-theft ECU and an air bag ECU which relate to a second embodiment.

At the beginning, by use of FIG. 7, an overview and features of the anti-theft ECU (anti-vehicle theft apparatus) and the air bag ECU (air bag control apparatus) which relate to this embodiment will be described. FIG. 7 is a block diagram showing structures of the anti-theft ECU and the air bag ECU which relate to this embodiment. As shown in the same figure, an apparatus which relates to this invention is configured by hard-wiring an anti-theft ECU 110 and an air bag ECU 120.

Out of them, the anti-theft ECU 110 is basically one which detects inclination of a vehicle due to jack-up and so on in case of stealing a vehicle and a tire (or vibration of a vehicle due to a turbulent action which may lead to theft), by utilizing an anti-theft acceleration sensor 111a for detecting acceleration in a X axis direction of a vehicle as an inclination sensor (or vibration sensor), and then, outputs an alarm (siren, etc.) which relates to anti-theft of a vehicle.

On one hand, the air bag ECU 120 is basically one which detects the shock in case that a collision accident of a vehicle occurred, by utilizing an air bag acceleration sensor 121a for detecting acceleration in a X axis direction of a vehicle as a shock sensor, and then, expands an air bag. Also, this air bag ECU 120 does not expand the air bag only by a detection result of the air bag acceleration sensor 121a, but expand the air bag for the first time in case that expansion permission, which is a precondition on the occasion of expanding the air bag, is given as so-called safing, and occurrence of an accident is being detected by the acceleration sensor 121a. In other words, a vehicle collision is separately detected by safing, and expansion permission is given as a precondition on the occasion of expanding the air bag.

And, the anti-theft ECU 110 and the air bag ECU 120 which relate to this embodiment have a main feature on safing for permitting expansion of an air bag to the air bag ECU 120, and it is designed to realize excellent safing from the viewpoint of a device structure and manufacturing cost of the air bag ECU 120, reliability of an operation and so on.

Here, briefly explaining about this main feature, in this embodiment, in an electronic component (anti-theft and electronic safing microcomputer 112 shown in FIG. 7) which is provided in the anti-theft ECU 110 which is a separate device other than the air bag control ECU 120, it is designed to judge whether or not expansion of the air bag is permitted on the basis of detection results of the anti-theft acceleration sensor 111a and the acceleration sensor 121a of the air bag ECU 120. That is, without newly mounting a logic IC, a microcomputer, and an safing acceleration sensor on the air bag ECU 120, it is designed to carry out expansion permission of the air bag by utilizing a logic IC, a microcomputer, and an acceleration sensor which have been already mounted on the anti-theft ECU 110 which is a separate device other than the air bag ECU. Therefore, as in the above-described main feature, without making a device structure of the air bag ECU 120 complicated, it becomes possible to configure an electronic safing system at less cost, and to secure reliability of an air bag operation.

Also, in case of configuring the electronic safing system by use of an separate device other than the air bag ECU 120, expansion judgment of the air bag requires high-speed judgment, whereas, if it is configured such that the separate device carries out control which is original to the device and control of air bag expansion judgment in a parallel manner, there is such a fear that delay occurs in processing of a low-end CPU for use in a vehicle. In this connection, in this embodiment, it is designed that the anti-theft ECU 110 which does not operate under such a condition that control of the air bag is inherently necessary (i.e., anti-theft ECU 110 which operates in case of absence of an occupant of a vehicle) is applied as the separate device, and thereby, an electronic safing system, which avoids the above-described problem and does not produce delay of processing, can be configured.

Further, the anti-theft ECU 110 and the air bag ECU 120 which relate to this embodiment, in relation to the above-described main feature, additionally has features which will be cited in the following. In other words, in this embodiment, there is a feature on such a point that, even in case of applying the anti-theft acceleration sensor 111a, which is mounted on a vehicle from an application other than safing of the air bag, to expansion judgment of the air bag (safing), it is designed to be able to surely carry out expansion judgment.

Explaining this briefly, since detection sensitivity which is used for judgment of anti-theft (e.g., approximately ±2 G) is one which is remarkably higher as compared with detection sensitivity which is suitable for expansion judgment of an air bag (e.g., approximately 100 G), in case that a detection result of the anti-theft acceleration sensor 111a is simply utilized for expansion judgment, a response will occur continuously for nothing. In this connection, in this embodiment, it is designed to be able to surely carry out expansion judgment, by switching detection sensitivity of the acceleration sensor 111a to detection sensitivity for use in air bag expansion judgment, on the occasion of utilizing the anti-theft acceleration sensor 111a for safing.

Also, in this embodiment, in alignment with the above-described switching of detection sensitivity, the frequency switching part 115 of the anti-theft ECU 110 switches a cutoff frequency of a noise elimination filter which is additionally disposed to the acceleration sensor 111a to a frequency (e.g., approximately 200 Hz) for use in air bag expansion judgment which is different from a frequency (e.g., approximately 50 Hz) for use in the anti-theft. That is, by this, it is designed such that it is possible to eliminate a high-frequency noise component which acts as a drag on the occasion of judging expansion of the air bag (high-frequency component due to vibration and electromagnetic noise and so on), and to surely carry out expansion judgment with a high degree of accuracy.

Also, in this embodiment, in alignment with the above-described switching of detection sensitivity, the power supply switching part 116 of the anti-theft ECU 110 is switched to a power supply mode for air bag expansion judgment, so as to supply power from the battery 101 only to the acceleration sensor 111a in the anti-theft ECU 110 (i.e., power supply is stopped to another devices such as transmitting and receiving part and so on which is originally incorporated in the anti-theft ECU 110 and performs a function to anti-theft). That is, by this, in addition to effectively using power of the battery, it is designed to be able to surely carry out expansion judgment of an air back.

Further, in this embodiment, an IG key monitor 117 of the anti-theft ECU 110 monitors ON/OFF states of the IG key SW (ignition key switch) 2, and in case that this was turned from the OFF state to the ON state, sends out a switching instruction for air bag expansion judgment to the sensitivity switching part 114, the frequency switching part 115 and the power supply switching part 116. That is, by this, it is designed such that, assuming that the ON state of the IG key SW 2 is deemed to be in-operation of a vehicle, the switching instruction for air bag expansion judgment is automatically sent out, and it becomes possible to switch detection sensitivity, frequency and power supply to ones for air bag expansion judgment always at appropriate timing, without necessity of a special operation for anti-theft by a driver.

(Structure of Anti-Theft ECU)

Next, by use of FIG. 7, a structure of the anti-theft ECU 110 shown in the same figure will be described. This anti-theft ECU 110 is disposed at a central part of a vehicle as a device for preventing theft of a vehicle (see, FIG. 9), and is basically one which detect inclination of a vehicle due to jack-up and so on (or vibration of a vehicle due to a turbulent action which may lead to theft) in case of stealing a vehicle and a tire, when a vehicle stops its operation (in case that the IG key SW 2 is in the OFF state), and then, outputs an alarm (siren, etc.) which relates to anti-theft of a vehicle.

And, as its basic structure, as shown in FIG. 7, it is equipped with the acceleration sensor 111a for detecting acceleration in a X axis direction of a vehicle, the anti-theft microcomputer 112, a siren etc. 113 (e.g., an emergency message transmission antenna, a siren speaker, a hazard lamp, a head lamp, and so on). In other words, in this anti-theft ECU 110, in case that the IG key SW 2 is in the OFF state, a detection result of the acceleration sensor 111a is inputted to the anti-theft microcomputer 112. And, the anti-theft microcomputer 112 judges a theft state (inclination and vibration) of a vehicle from the detection result, and in case that it detect such inclination and vibration, an alarm action is carried out through the siren etc. 113 (e.g., alarm siren is sounded from a siren speaker, and the hazard lamp and the head lamp are made to be flashed, and further, an emergency situation is notified to an owner from the emergency notification antenna).

On one hand, the such anti-theft ECU 110 is, other than the suchlike basic structure, as a structure which relates the above-described feature, equipped with the sensitivity switching part 114, the frequency switching part 115, the power supply switching part 116, the IG key monitor 117, and an electronic safing microcomputer 126 (also used as the above-described anti-theft microcomputer 112), and in case that the IG key SW 2 is in the OFF state, so-called electronic safing is carried out. Hereinafter, structures which relate to these features will be described.

The sensitivity switching part 114 is a processing part which receives the switching instruction from the IG key monitor 117, and switches detection sensitivity of the acceleration sensor 111a to detection sensitivity for air bag expansion judgment or for anti-theft. Concretely speaking, when the switching instruction for air bag expansion judgment was received from the IG key monitor 117, detection sensitivity which was used for judgment of anti-theft (approximately ±2 G) is switched to detection sensitivity which is suitable for expansion judgment of an air bag (approximately ±100 G). As a result of this, after the IG key SW 2 was turned to the ON state, a detection result of acceleration of the acceleration sensor 111a is outputted to the electronic safing microcomputer 126 and an electronic safing IC 125 with resolution of approximately ±100 G. In addition, this switching of the detection sensitivity will be described later as "Structure of Peripheral Circuit of Acceleration Sensor".

The frequency switching part 115 is a processing part which receives the switching instruction from the IG key monitor 117, and switches a cutoff frequency of a filter to one for air bag expansion judgment or for anti-theft, in order to eliminate high-frequency noise from a detection result of the acceleration sensor 111a. Concretely speaking, when the switching instruction for air bag expansion judgment was received from the IG key monitor 117, a low-pass (high-cut) filter of approximately 50 Hz for use in anti-theft is switched to a high-pass (low-cut) filter of approximately 200 Hz for use in air bag expansion judgment. In addition, this switching of the filters will be described later as "Structure of Peripheral Circuit of Acceleration Sensor".

The power supply switching part 116 is a processing part which receives the switching instruction from the IG key monitor 117, and switches power supply in the anti-theft Ecu 110 to an air bag expansion judgment mode or an anti-theft mode. Concretely speaking, when the switching instruction for use in air bag expansion judgment was received from the IG key monitor 117, power supply is switched so as to supply power from the battery 101 only to the electronic safing microcomputer 126 (in other words, power is not supplied to a portion which does not require for air bag control, such as a transmitting and receiving part for communicating with a remote controller, and so on). In addition, this switching of power supply can be realized by so-called switch control.

The IG key monitor 117 monitors the ON/OFF states of the IG key SW 2, and in case that the IG key SW 2 was turned to the ON state, sends out the switching instruction for use in air bag expansion judgment to the sensitivity switching part 114, the frequency switching part 115 and the power supply switching part 116. Also, in case that the IG key SW 2 was turned to the OFF state, with lapse of predetermined time, the switching instruction for anti-theft is sent out to the sensitivity switching part 114, the frequency switching part 115 and the power supply switching part 116.

The reason that the switching instruction for anti-theft is sent out after the IG key SW 2 was turned to the OFF state and then, predetermined time has passed, as described above is that detection sensitivity, frequency and power supply for air bag expansion judgment are maintained for predetermined time, and expansion judgment of an air bag can be surely carried out even to accident occurrence right after a vehicle was parked. In addition, it is possible to carry out switching by applying every conditions such as for example, switching being carried out after it was detected (detection of opening and closing of a door by a boarding sensor and a door courtesy switch, and so on) that an occupant of a vehicle got off, other than the condition of such "after predetermined time".

The electronic safing microcomputer 126 is a computer processing part which judges whether or not expansion of an air bag is permitted on the basis of a detection result of the acceleration sensor 111a of the anti-theft ECU 110. Concretely speaking, by utilizing a detection result of the air bag acceleration sensor 121a, in addition to a detection result of the anti-theft acceleration sensor 111a, judged by a computer is whether or not both detection results exceeded a predetermined threshold value, respectively, and in case that the respective detection results exceeded the predetermined value, ignition permission for permitting expansion of an air bag is given to the electronic safing IC 125. In addition, the reason that the air bag acceleration sensor 121a was utilized for expansion permission judgment of an air bag as described above is that accuracy of judgment is heightened by utilizing a plurality of acceleration sensors which were mounted in a separate device.

(Structure of Air Bag ECU)

Next, by use of FIG. 7, a structure of the air bag ECU 120 shown in the same figure will be described. This air bag ECU 120 is one which is disposed at a center part of a vehicle as a device for controlling a so-called front collision air bag (see, FIG. 9), and detects a shock in case that a collision accident of a vehicle occurred when a vehicle is in operation (in case that the IG key SW 2 is in the ON state), and expands an air bag. And, as its basis structure, as shown in FIG. 7, it is equipped with the acceleration sensor 121a for detecting acceleration in a X axis direction of a vehicle, an air bag control main microcomputer 122, an ignition IC 123, and a squib 124.

That is, in this air bag ECU 20, a detection result from the acceleration sensor 121a is inputted to the air bag control main microcomputer 122. This airbag control main microcomputer 122 judges whether or not a shock occurred due to a collision accident of a vehicle, on the basis of size and temporal change of acceleration inputted, and inputs an ignition signal to the ignition IC 123, in case that occurrence of the such shock was detected.

And, the ignition IC 123 monitors, by hardware control, an ignition signal which is inputted from the air bag control main microcomputer 122, and an expansion permission signal which is inputted from an electronic safing IC 125 which will be described later. As a result of that, the ignition IC 123 controls so as to have an air bag expanded instantaneously by having the squib 124 fired, in case that AND of the ignition signal and the expansion permission signal was realized.

On one hand, the such air bag ECU 120 is equipped with the electronic safing IC 125, as a structure which relates to the above-described electronic safing microcomputer 126, as shown in FIG. 7, and inputs the ignition permission signal to the above-described ignition IC 123 as safing. This electronic safing IC 125 is means for judging expansion permission of an air bag in the same manner as (and in association with) the electronic safing microcomputer 126, but is a logic IC for carrying out judgment by use of hardware, unlike the electronic safing microcomputer 126.

Concretely speaking, detection results of the anti-theft acceleration sensor 111a and the air bag acceleration sensor 121a are integrated respectively and latched, and in case that both of respective detection results exceeded a predetermined threshold value, ignition permission for permitting expansion of airbag comes into force. And, in case that AND of the ignition permission which was given from the electronic safing microcomputer 126 and the ignition permission which came into force internally was realized, an ignition permission signal for finally permitting expansion of an air bag is inputted to the above-described ignition IC 123.

In addition, the reason that expansion permission judgment of an air bag was carried out also in the electronic safing IC 125 in addition to the electronic safing microcomputer 126, and furthermore, respective expansion permission judgments are carried out by use of different means (microcomputer and logic IC) as described above is to heighten accuracy of judgment.

(Process Procedures of Anti-Theft ECU and Air Bag ECU)

Figure 8:
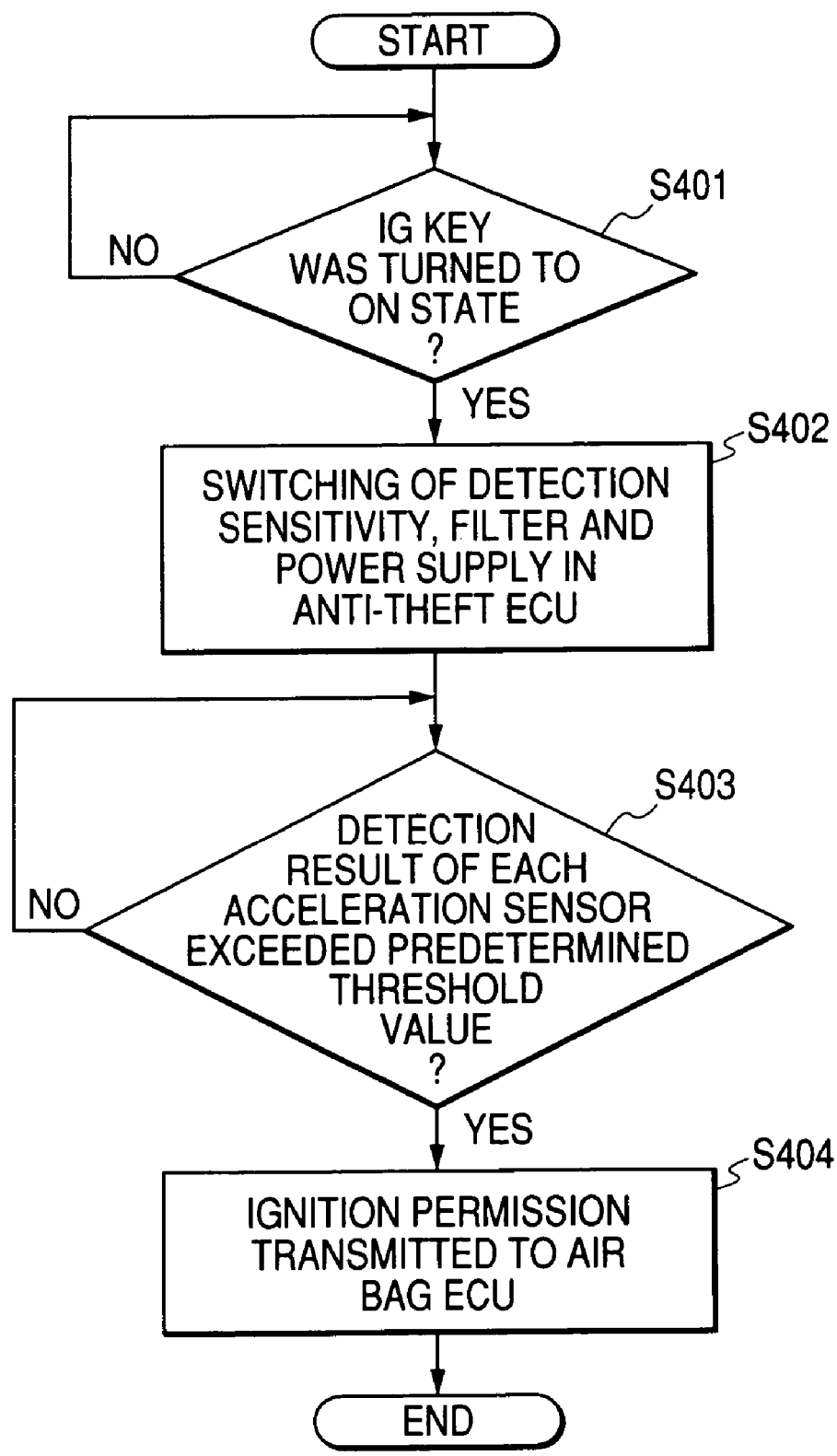
FIG. 8 is a flow chart showing process procedures of the anti-theft ECU and the air bag ECU which relate to the second embodiment.

Next, by use of FIG. 8, process procedures (expansion permission method of an air bag) of the anti-theft ECU 110 and the air bag ECU 120 will be described. FIG. 8 is a flow chart showing process procedures of the anti-theft ECU and the air bag ECU which relate to this embodiment. As shown in the same figure, the IG key monitor 117 of the anti-theft ECU 110 repeatedly monitors whether or not the IG key SW 2 was turned to the ON state (step S401).

And, in case that the IG key SW 2 was turned to the ON state (affirmative in the step S401), a switching instruction for air bag expansion judgment is sent out to the sensitivity switching part 114, the frequency switching part 115 and the power supply switching part 116, and each switching is made to be carried out (step S402). That is, detection sensitivity of the acceleration sensor 111a is switched to detection sensitivity which is suitable for expansion judgment of an air bag (approximately ±100 G), and a filter for noise elimination is switched to a high-pass (low-cut) filter of approximately 200 Hz which is used for air bag expansion judgment, and power supply from the battery 101 is switched so as to supply power only to the acceleration sensor 111a. In addition, in response to this switching, a detection result of the acceleration sensor 111a is inputted to the air bag ECU.

Subsequently, the electronic safing microcomputer 126 judges whether or not expansion of an air bag is permitted (step S403). That is, in the electronic safing microcomputer 126, judged by a computer is whether or not detection results of the anti-theft acceleration sensor 111a and the air bag acceleration sensor 121a exceeded a predetermined threshold value, respectively. As a result of that, in case that respective detection results exceeded the threshold value (affirmative in the step S403), ignition permission is transmitted to the electronic safing IC 125 of the air bag ECU 120.

In addition, in the electronic safing IC 125, detection results of the anti-theft acceleration sensor 111a and the air bag acceleration sensor 121a are integrated respectively and latched, and in case that both of respective detection results exceeded a predetermined threshold value, ignition permission for permitting expansion of air bag comes into force. And, in case that AND of the ignition permission which was given from the electronic safing microcomputer 126 and the ignition permission which came into force internally was realized, the electronic safing IC 125 outputs an ignition permission signal for finally permitting expansion of an air bag to the ignition IC 123.

By going through the above-described series of processes, it is possible to carry out expansion permission of an air bag by utilizing a logic IC, a microcomputer, and an acceleration sensor which have already mounted on the anti-theft ECU 110 which is a separate device different from the air bag ECU, not by newly mounting a logic IC, a microcomputer, and an acceleration sensor on the air bag ECU 120. Therefore, as in the above-described main feature, without making a device structure of the air bag ECU 120 complicated, it becomes possible to configure an electronic safing system at less cost, and to secure reliability of an air bag operation.

(Other Embodiments)

In the meantime, up to this, the embodiments of this invention were described, but this invention, other than the above-described embodiments, may also be carried out by various different embodiments. In this connection, in the following, different embodiments will be described by separating into (1) applicable structure, (2) expansion permission judgment, (3) filter, (4) power supply, (5) switching instruction, and (6) others, respectively.

(1) Applicable Structure

In this embodiment, described was such a case that the air bag acceleration sensor 121a is also utilized in addition to the anti-theft acceleration sensor 111a, in expansion judgment of the electronic safing microcomputer 126 and the electronic safing IC 125, but this invention is not limited to this, may be designed so as to utilize only the anti-theft acceleration sensor 111a.

Figure 9:
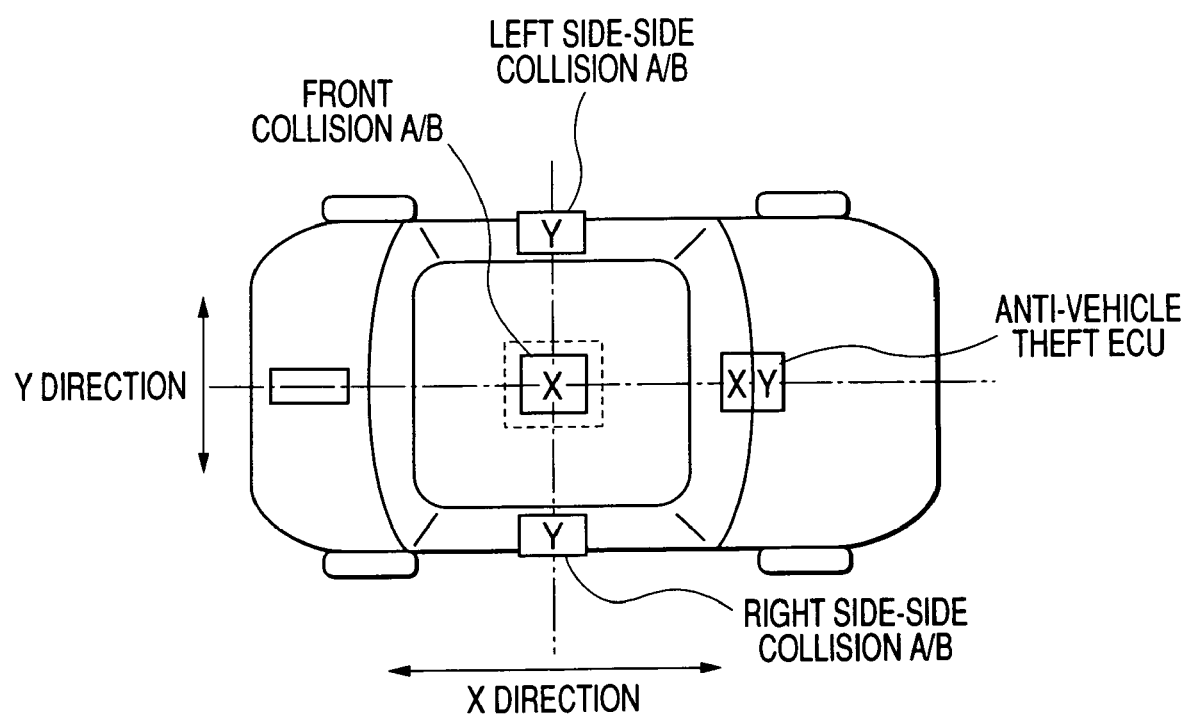
FIG. 9 is an explanatory view showing a layout of the anti-theft ECU and the air bag ECU.
Figure 10:
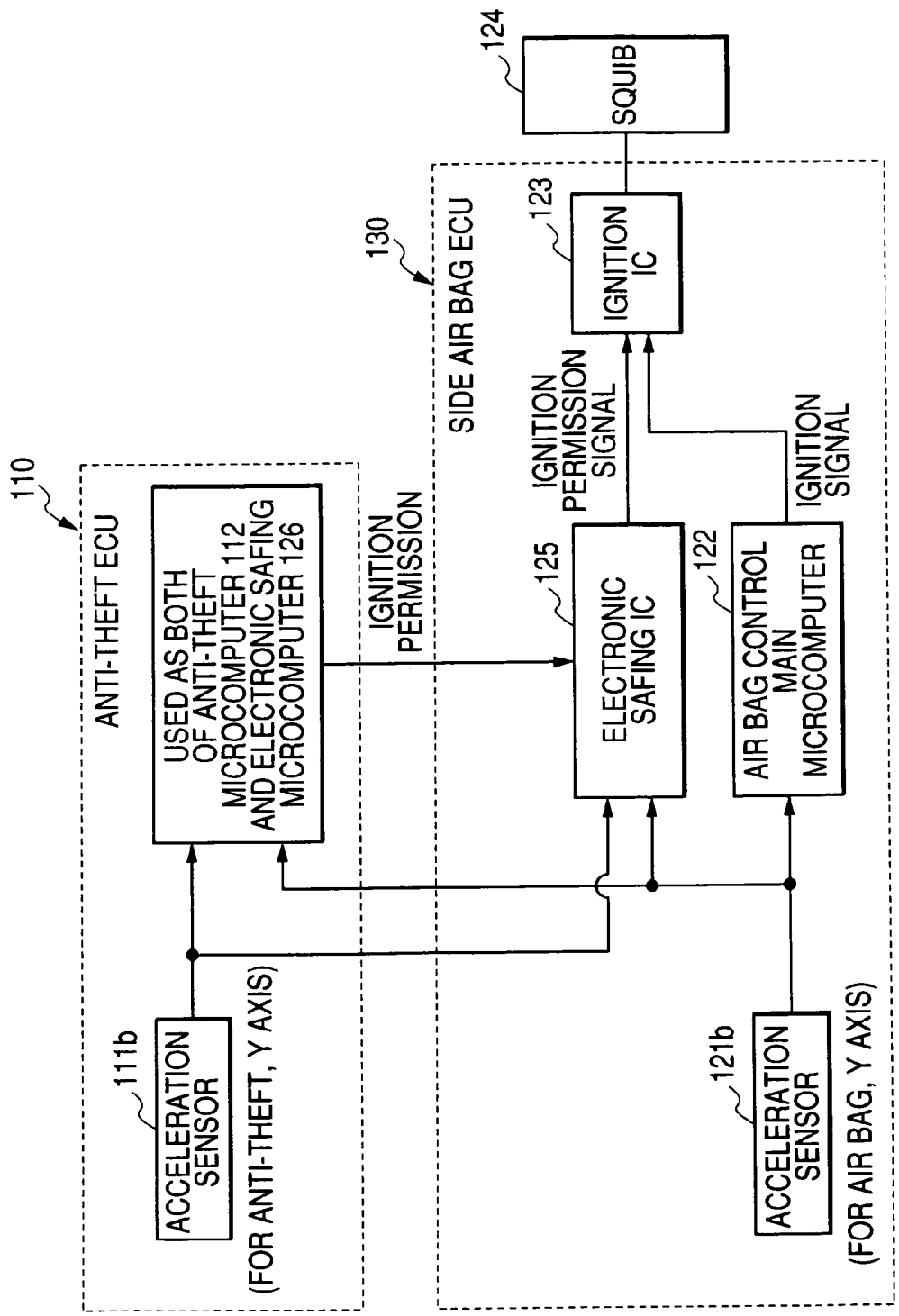
FIG. 10 is a view for illustrating a case of carrying out judgment of expansion permission by utilizing a Y axis acceleration sensor in the anti-theft ECU as the first and second embodiments.

Also, in this embodiment, described was such a case that this invention was applied to safing of the front collision air bag ECU 120, but this invention is not limited to this, and it is possible in the same manner to safing of the side collision side air bag ECU (see, FIG. 9). In other words, in this case, as shown in FIG. 10, in an electronic component (electronic safing microcomputer 126 shown in FIG. 10) which is provided in the anti-theft ECU 110, judged is whether or not expansion of an air bag is permitted, on the basis of a detection result of the Y axis direction acceleration sensor 111b which was separately mounted on the anti-theft ECU 110 and a detection result of the acceleration sensor 121b of the side air bag ECU 130.

Figure 11:
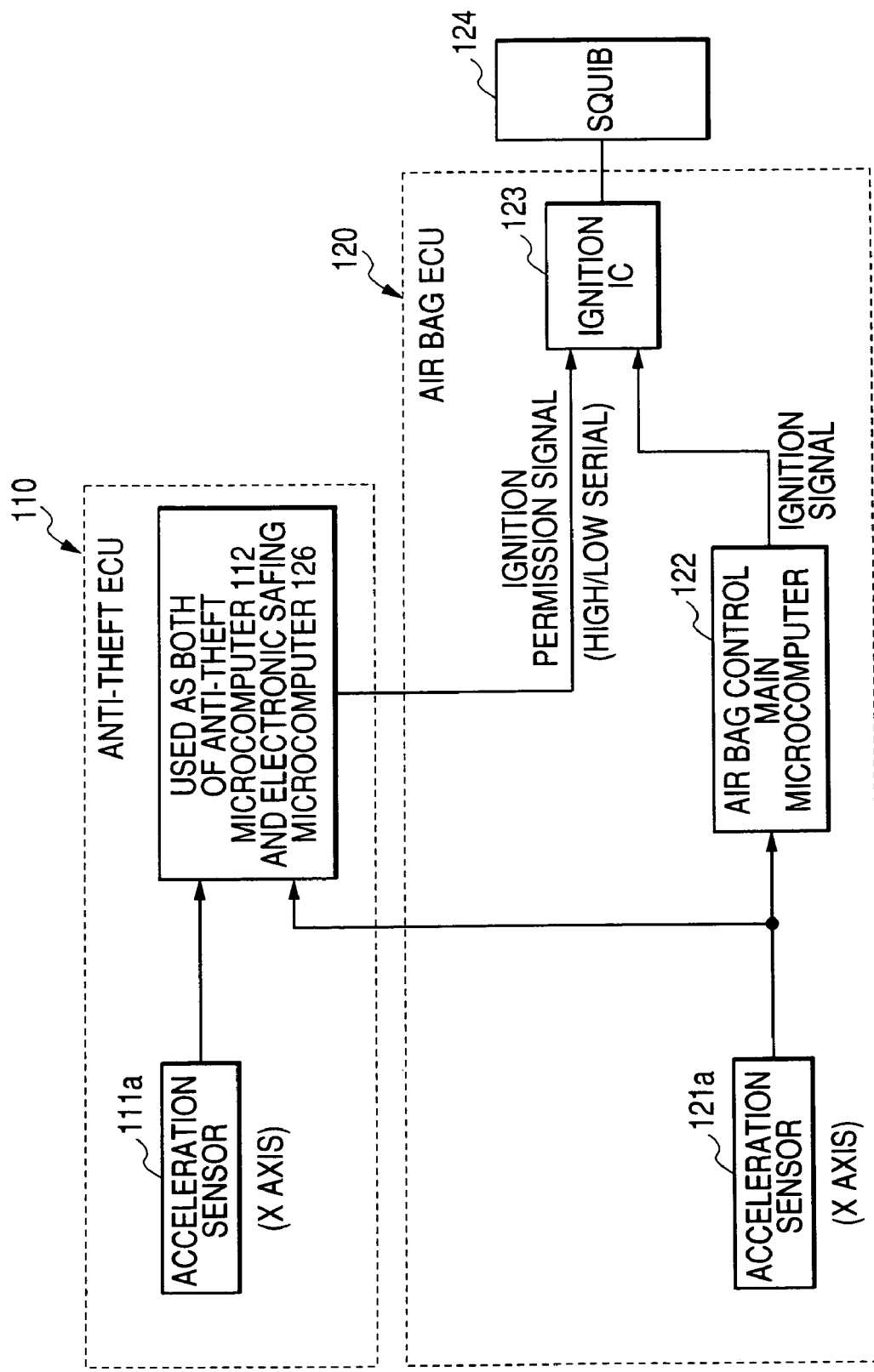
FIG. 11 is a view for illustrating a case of carrying out judgment of expansion permission by utilizing only the acceleration sensor and an microcomputer in the anti-theft ECU as the first and second embodiments.

In this embodiment, described was such a case that expansion judgment of an air bag is carried out in a multiple-state manner in the electronic safing microcomputer 126 and the electronic safing IC 125, but this invention is not limited to this, and it is also applicable in the same manner to such a case that only the electronic safing microcomputer 126 carries out expansion judgment by itself. In other words, as shown in FIG. 11, it may be designed to directly transmit expansion permission to the ignition IC 123 of the air bag ECU 120 from the anti-theft ECU 110. Also, this expansion permission is not transmitted by a High/Low signal, but may be transmitted as a serial signal having a predetermined protocol, and influence of noise is suppressed by the such serial signal so that it becomes possible to surely secure reliability of an air bag operation.

Also, in this embodiment, described was such a case that, as a component which is provided in the anti-theft ECU 110, a microcomputer which is provided in the anti-theft ECU 110 is utilized for expansion judgment, but it is also applicable in the same manner to such a case that only the acceleration sensor 111 (111a or 111b) is utilized for expansion judgment. In other words, in this case, as shown in FIG. 12, a detection result of the anti-theft acceleration sensor 111a is transmitted to the air bag ECU 120, and, in an electronic component (electronic safing microcomputer 126 shown in FIG. 12) which is provided in the anti-theft ECU 110, judged is whether or not expansion of an air bag is permitted.

Figure 12:
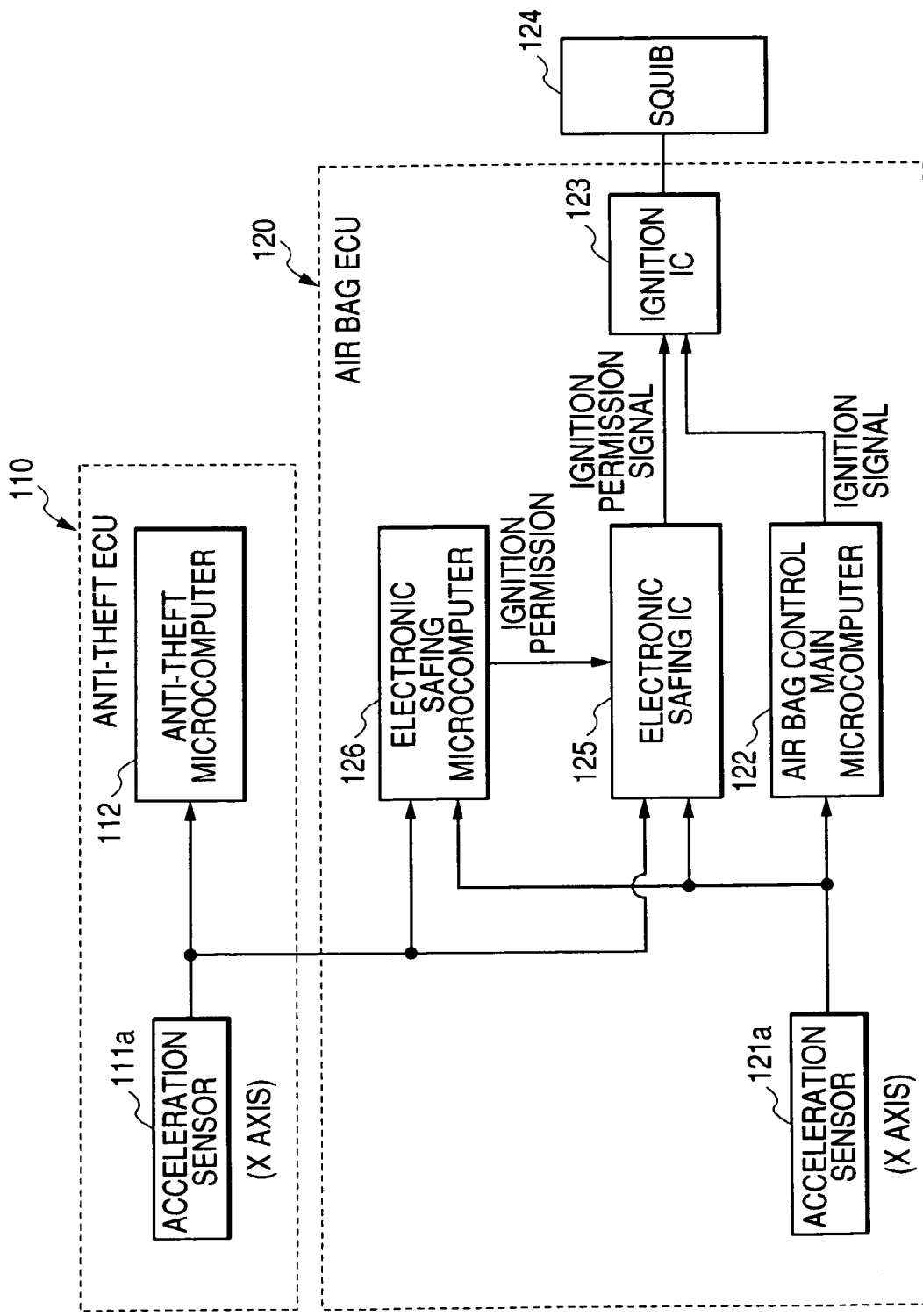
FIG. 12 is a view for illustrating a case of carrying out judgment of expansion permission by utilizing an microcomputer in the air bag ECU as another embodiment other than the first and second embodiments.

Also, although it is not shown in the figure like FIGS. 11 and 12, it may be designed such that, in each of an electronic component which is provided in the anti-theft ECU 110 and an electronic component which is provided in the air bag ECU 120, by judging whether or not expansion of an air bag is permitted on the basis of a detection result of the anti-theft acceleration sensor 111 and/or the air bag acceleration sensor 121, in case that expansion was permitted in each of them, expansion of an air bag is finally permitted.

In addition, in FIGS. 10–11, each part to which the same signs as in FIG. 7 were applied are ones which are operated in the same functions, respectively, and for example, also in FIGS. 10–11, the electronic safing IC 125 is operated by use of software, and the ignition IC 123 and the electronic safing IC 125 are operated by use of hardware.

Also, in this embodiment, described was such a case that this invention was applied to the anti-theft ECU 110 as another control device, but this invention is not limited to this, and it is also applicable in the same manner to an in-vehicle ECU which is not operated when there is a necessity of carrying out air bag control.

(2) Expansion Permission Judgment

In this embodiment, a judgment condition was set to that, in expansion judgment of the electronic safing microcomputer 126 and the electronic safing IC 125, detection results of the anti-theft acceleration sensor 111a and the airbag acceleration sensor 121a exceeded a predetermined threshold value, respectively, but this invention is not limited to this, and a judgment condition may be set to that only any one of detection results exceeds the threshold value. In other words, in this case, if any one of detection results exceeds the predetermined threshold value, expansion of an air bag is permitted, and therefore, it is possible to react even in case that any one of them went out of order and the like.

Also, in this embodiment, described was such a case that expansion judgment of an air bag is carried out by independently utilizing each detection result of each acceleration sensor (e.g., the anti-theft acceleration sensor 111*a* and the air bag acceleration sensor 121*a*), but this invention is not limited to this, and it is also applicable in the same manner to such a case that expansion permission is judged with a high degree of accuracy, by utilizing a synthetic vector which was calculated from detection results of a plurality of acceleration sensors.

Figure 13:
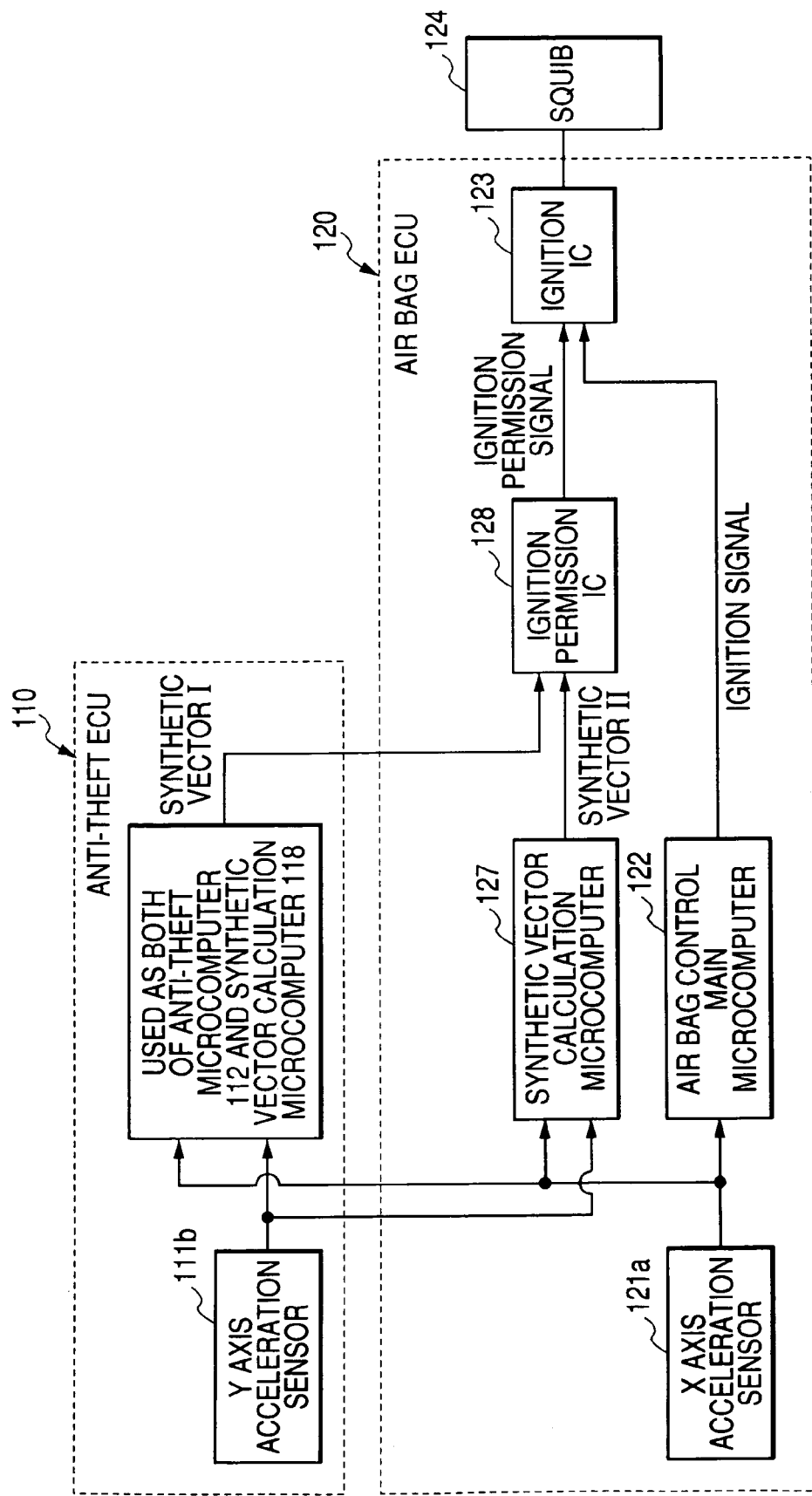
FIG. 13 is a view for illustrating one example in case of carrying out judgment of expansion permission by utilizing a synthetic vector as another embodiment other than the first and second embodiments.

That is, in this case, as shown in FIG. 13, in each of an electronic component (synthetic vector calculation microcomputer 118 which is also used as the anti-theft microcomputer 112 shown in the same figure) which is provided in the anti-theft ECU 110 and an electronic component (synthetic vector calculation microcomputer 127 shown in the same figure) which is provided in the air bag ECU 120, calculated is a synthetic vector between the anti-theft Y axis acceleration sensor 111*b* and the X axis acceleration sensor 121*a* of the front collision air bag. And, in an electronic component (ignition permission IC 128 shown in the same figure), judges is whether or not the synthetic vectors which were calculated by them coincide with each other (in size and direction), and in case that they coincide with each other, an ignition permission signal is inputted to the ignition IC 123.

Figure 14:
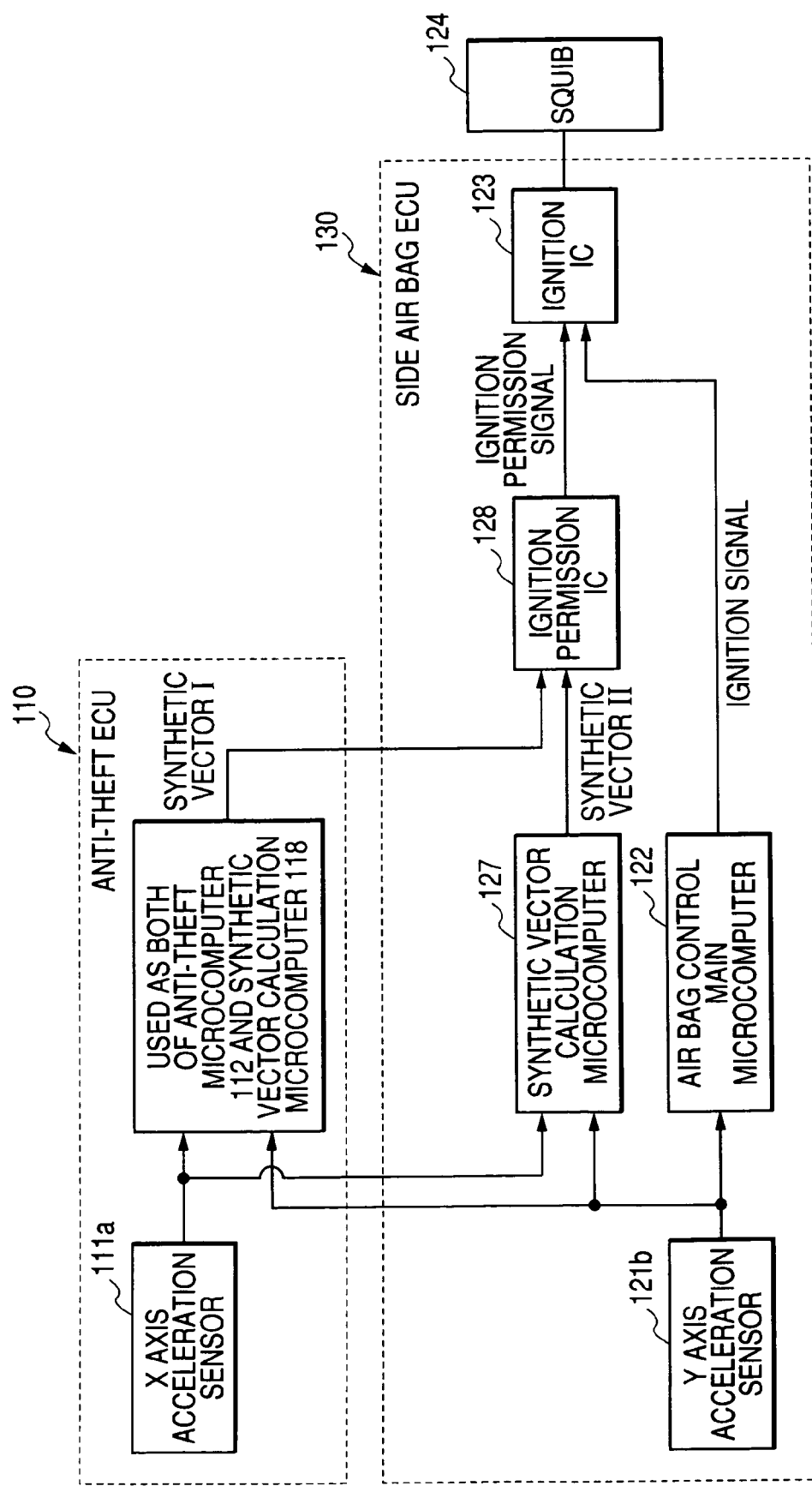
FIG. 14 is a view for illustrating one example in case of carrying out judgment of expansion permission by utilizing a synthetic vector as another embodiment other than the first and second embodiments.

Also, expansion judgment utilizing the such synthetic vector is not limited to the above-described one which was shown in FIG. 13, and for example, as shown in FIG. 14, it is also applicable in the same manner to such a case that the synthetic vector between the anti-theft X axis acceleration sensor 111*a* and the Y axis acceleration sensor 121*b* of a side collision air bag is calculated by each of the side air bag ECU 130 and the anti-theft ECU 110. In addition, also in FIGS. 14–17, in the same manner as in the above-described FIG. 13, the synthetic vector calculation microcomputer 118 is also used as the anti-theft microcomputer 112.

Figure 15:
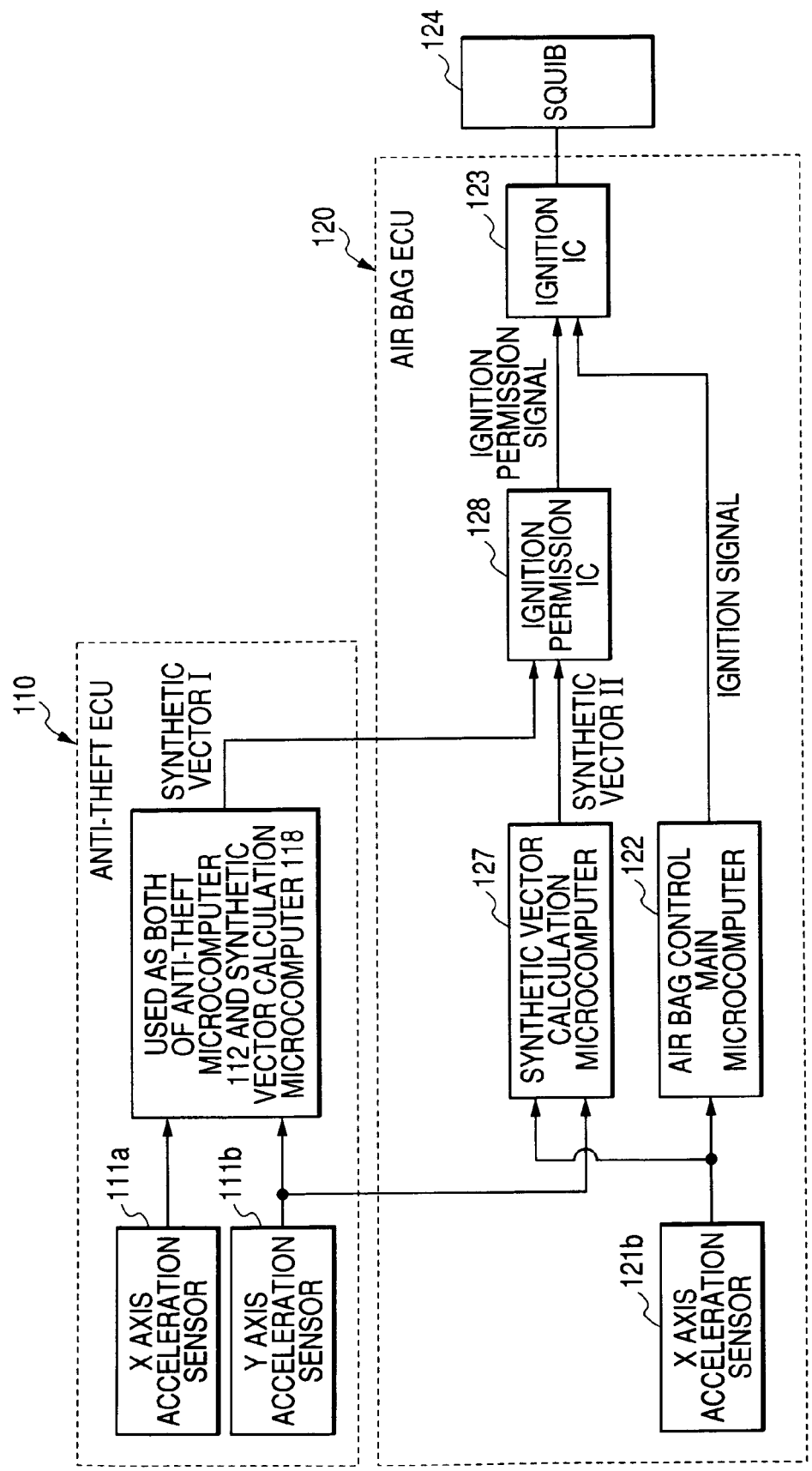
FIG. 15 is a view for illustrating one example in case of carrying out judgment of expansion permission by utilizing a synthetic vector as another embodiment other than the first and second embodiments.

Also, in the same manner as this, as shown in FIG. 15, it is also applicable in the same manner to such a case that, on one hand, a synthetic vector between the anti-theft X axis acceleration sensor 111*a* and the anti-theft Y axis acceleration sensor 111*b* is calculated in the anti-theft ECU 110, and, on the other hand, a synthetic vector between the X axis acceleration sensor 121*a* of a front collision air bag and the anti-theft Y axis acceleration sensor 111*b* is calculated in the air bag ECU 120.

Also, for example, as shown in FIG. 16, it is also applicable in the same manner to such a case that, on one hand, a synthetic vector between the anti-theft X axis acceleration sensor 111*a* and the anti-theft Y axis acceleration sensor 11*b* is calculated in the anti-theft ECU 110, and, on the other hand, a synthetic vector between the Y axis acceleration sensor 121*b* of a side collision air bag and the anti-theft X axis acceleration sensor 111*a* is calculated in the air bag ECU 130.

Further, as shown in FIG. 17, it is also applicable in the same manner to such a case that, on one hand, a synthetic vector between the anti-theft X axis acceleration sensor 111*a* and the anti-theft Y axis acceleration sensor 111*b* is calculated in the anti-theft ECU 110, and, on the other hand, a synthetic vector between the X axis acceleration sensor 121*a* of a front collision air bag and the Y axis acceleration sensor 121*b* of a side collision air bag is calculated in the air bag ECU 120.

In addition, in FIGS. 13–17, the synthetic vector calculation microcomputers 118 and 127 are ones which are operated by use of software in the same manner as the electronic safing IC 125 shown in FIG. 7, but the ignition permission IC 128 and the ignition IC 123 are ones which are operated by use of hardware in the same manner as the electronic safing IC 125 shown in FIG. 7 and so on.

Also, in the foregoing, described was such a case that electronic safing control utilizing vector operation is carried out in the anti-theft ECU 110, but this invention is not limited to this, and it is also available in the same manner to such a case that the vector operation is carried out in an in-vehicle ECU other than the anti-theft ECU 110 as described above.

(3) Filter

In this embodiment, described was such a case that noise is eliminated by a filter, but this invention is not limited to this, and it is also applicable in the same manner to every noise elimination methods, such as, for example, periodical integration of a detection result of an acceleration sensor. That is, it is possible to simply eliminate a high-frequency noise component by periodical integration and so on, without using a filter circuit.

Also, in this invention, it becomes possible to simply and surely eliminate a high-frequency noise component, not only by use of noise elimination by a filter but also by simultaneous use of noise elimination according to periodical integration as described above. In addition, also in case of adopting the noise elimination by periodical integration, in the same manner as switching of a cutoff frequency of a filter (switching of low-pass and high-pass), a band of noise which is an object to be eliminated is switched.

(4) Power Supply

In this embodiment, described was such a case that, in the anti-theft ECU 110 shown in FIG. 7, on the occasion of expansion judgment of an air bag, power is supplied only to the electronic safing microcomputer 126, but this invention is not limited to this, and it is also applicable in the same manner to such a case that power is supplied only to a component which is necessary for expansion judgment of an air bag in the anti-theft ECU 110. That is, in the anti-theft ECU 110 shown in FIGS. 12–17, on the occasion of expansion judgment of an air bag, power is supplied only to the synthetic vector calculation microcomputer 118.

Also, in this embodiment, described was such a case that power is supplied from the battery 101 of a vehicle, but this invention is not limited to this, and it is also applicable in the same manner to such a case that power is supplied from a part other than the battery 101, such as power being supplied from, for example, a dry battery which was mounted on the air bag ECU 110 and the anti-theft ECU 120, and so on. In addition, even in case that power is supplied from the dry battery which was mounted on the air bag ECU 110 and the anti-theft ECU 120, it is controlled so as to supply power only to the electronic safing microcomputer 126 and the synthetic vector calculation microcomputer 118 on the occasion of expansion judgment of an air bag.

(5) Switching Instruction

In this embodiment, described was such a case that the IG key monitor 117 monitors a state of the IG key SW 2, and when the IG key SW 2 is turned to the ON state, a switching instruction for expansion judgment of an air bag is transmitted, but this invention is not limited to this, and it is also applicable in the same manner to such a case that another state other than the IG key SW 2 (e.g., a drive state of an engine, a state of other switch and device, and so on) is monitored to send out the switching instruction.

In other words, for example, it may be designed such that ON/OFF states of the IG key SW 2 and a detection result of a vehicle occupant detection sensor (pressure sensor) are monitored, and in case that the IG key SW 2 is in the ON state and the vehicle occupant detection sensor detected an occupant of a vehicle, the switching instruction for air bag expansion judgment is sent out, and thereby, assuming that such a state that boarding was detected in the ON state of the IG key SW 2 is deemed to represent that a vehicle is in operation, it is automatically swtiched to one for air bag expansion judgment.

Also, for example, it may be designed such that ON/OFF states of the IG key SW 2 and ON/OFF states of the anti-theft ECU 110 (states of a power switch) are monitored, and in case that the IG key SW 2 is in the ON state and the power switch of the anti-theft ECU 110 is turned to the OFF state, the switching instruction for air bag expansion judgment is sent out, and thereby, assuming that such a state that power-off of the anti-theft ECU 110 was detected in the ON state of the IG key SW 2 is deemed to represent that a vehicle is in operation, it is automatically switched to one for air bag expansion judgment.

(6) Others

Also, each structural element of the anti-theft ECU and the air bag ECU shown in each figure is functional conceptual one, and it is not necessarily required that it is configured physically as shown in the figure, and it is possible to configure it by functionally or physically dispersing/integrating all or a part of them with an arbitrary unit, according to a processing load, a manufacturing state, a use state and so on. For example, it is possible to configure in such a manner that, in the anti-theft ECU 110 shown in FIG. 7, the anti-theft microcomputer 112 and the electronic safing microcomputer 126 are separated, and in the air bag ECU 120 shown in FIG. 13, the synthetic vector calculation microcomputer 127 and the air bag control main microcomputer 122 are integrated, and so on.

Also, a circuit structure and an ON/OFF theory of the anti-theft ECU and the air bag ECU shown in each figure are not limited to ones shown in the figures, but may be configured by another circuit and theory which perform similar functions. Also, in the same manner as this, with regard to each processing function which is carried out in each ECU, all or an arbitrary part of them may be realized by a CPU and a program which is analytically executed by the CPU, or may be realized as hardware according to wired logic. For example, it is possible to configure in such a manner that, for example, a function of the electronic safing microcomputer 126 of the air bag ECU 120 shown in FIG. 7 is realized by a logic IC, and in contrast to this, a function of the electronic safing IC 125 is realized by a microcomputer, and so on.

Further, it is alto possible to manually carry out all or a part of processes (e.g., switching of detection sensitivity, switching of frequency, switching of power supply, and so on) which were described as ones which are carried out automatically, among each process which was described in this embodiment, or it is also possible to automatically carry out, by a known method, all or a part of processes which were described as ones which are carried out manually. Other, than this, it is possible to arbitrarily change process procedures, control procedures and concrete names which were shown in the above text and figures, and information including various data and parameters (e.g., GAIN value of detection sensitivity, cutoff frequency, resistor value, and so on) except for a specified case.

In addition, the expansion permission method which was described in this embodiment can be realized by executing a program which was prepared in advance by a computer (including a computer which was incorporated in the anti-theft ECU and the air bag ECU). This program can be distributed through a network such as Internet. Also, this program can be executed by being recorded on a computer-readable recording medium such as a hard disc, a flexible disc (FD), a CD-ROM, a MO, a DVD and so on, and by being read out from the recording medium by a computer.

As described above, according to the invention of aspect 1, achieved is such an advantage that it is possible to obtain an anti-theft apparatus which can surely detect a theft state of a vehicle, even in such a case that various acceleration sensors which are mounted on a vehicle from an application other than anti-theft is also used as anti-theft.

Also, according to the invention of aspect 2, achieved is such an advantage that it is possible to judge the theft state (concretely speaking, inclination or vibration) in multiple aspects by a combination of detection results of the plurality of acceleration detection units and to prevent misjudgment, and it is possible to obtain an anti-theft apparatus which can detect the theft state of a vehicle with a high degree of accuracy.

Also, according to the invention of aspect 3, achieved is such an advantage that it is possible to simply judge a theft state (concretely speaking, inclination or vibration) of a vehicle by a detection result of any one of acceleration detection units, and it is possible to obtain an anti-theft apparatus which can detect the theft state of a vehicle with a high degree of accuracy.

Also, according to the invention of aspect 4, achieved is such an advantage that it is possible to carefully detect the theft state (concretely speaking, inclination or vibration) of a vehicle by detection results of a plurality of acceleration detection units, and it is possible to obtain an anti-theft apparatus which can detect the theft state of a vehicle with a high degree of accuracy.

Also, according to the invention of aspect 5, achieved is such an advantage that it is possible to obtain an anti-theft apparatus which can surely detect inclination of a vehicle due to jack-up and so on for theft.

Also, according to the invention of aspect 6, achieved is such an advantage that it is possible to obtain an anti-theft apparatus which can surely detect vibration of a vehicle due to a turbulent action which may lead to theft.

Also, according to the invention of aspect 7, achieved is such an advantage that it is possible to obtain an anti-theft apparatus which can improve detection accuracy, since vibration which is applied to a vehicle is detected easier at an outer edge part, in case of detecting a theft state assuming vibration.

Also, according to the invention of aspect 8, achieved is such an advantage that it is possible to obtain an anti-theft apparatus which can secure detection accuracy at the central part, taking into consideration that vibration which is applied to a vehicle is detected easier at the outer edge part.

Also, according to the invention of aspect 9, achieved is such an advantage that it is possible to obtain an anti-theft apparatus which can judge the theft state (concretely speaking, inclination or vibration) by an acceleration sensor which is basically fixed to a vehicle stoutly and to which a behavior to the vehicle is directly applied, and thus, cannot only reduce a cost but also improve detection accuracy, as compared with such a case that an anti-theft dedicated ECU is provided at later time.

Also, according to the invention of aspect 10, achieved is such an advantage that it is possible to obtain an anti-theft apparatus which can eliminate a high-frequency noise component (high-frequency component due to vibration which is different from inclination due to jack-up and electromagnetic noise and so on) which acts as a drag on the occasion of judging the theft state (concretely speaking, inclination or vibration) of a vehicle, and can judge the theft state of a vehicle with a high degree of accuracy.

Also, according to the invention of aspect 11, achieved is such an advantage that it is possible to obtain an anti-theft apparatus which can simply eliminate a high-frequency noise component, by switching of so-called low-pass and high-pass filter circuits.

Also, according to the invention of aspect 12, achieved is such an advantage that it is possible to obtain an anti-theft apparatus which can simply eliminate a high-frequency noise component, without using a filter circuit.

Also, according to the invention of aspect 13, achieved is such an advantage that it is possible to obtain an anti-theft apparatus which can simply and surely eliminate a high-frequency noise component, by a simultaneous use of a filter circuit and periodical integration.

Also, according to the invention of aspect 14, achieved is such an advantage that it is possible to obtain an anti-theft apparatus which can surely detect the theft state (concretely speaking, inclination or vibration) of a vehicle, in addition to effectively using power of a battery or dry battery.

Also, according to the invention of aspect 15, achieved is such an advantage that it is possible to obtain an anti-theft apparatus which can more reduce consumption of a battery or dry battery, and can more effectively use power of a battery or dry battery.

Also, according to the invention of aspect 16, achieved is such an advantage that it is possible to obtain an anti-theft apparatus which can urgently avoid consumption of a battery or dry battery, and secure power to a portion which is indispensable for a vehicle.

Also, according to the invention of aspect 17, achieved is such an advantage that it is possible to obtain an anti-theft apparatus which can properly send out an anti-theft instruction according to such a state that a vehicle is parked and so on, and can switch detection sensitivity at appropriate timing.

Also, according to the invention of aspect 18, achieved is such an advantage that it is possible to obtain an anti-theft apparatus which can automatically send out an anti-theft instruction, assuming that an OFF state of an ignition key is deemed to represent that vehicle is parked, and can switch detection sensitivity always at appropriate timing, without necessity of a special operation for anti-theft by a driver.

Also, according to the invention of aspect 19, achieved is such an advantage that it is possible to obtain an anti-theft method which can surely detect the theft state of a vehicle, even in case that various acceleration sensors which are mounted on a vehicle from an application other than anti-theft are also used as anti-theft.

Also, according to the invention of aspect 20, achieved is such an advantage that it is possible to obtain an anti-theft program which can surely detect the theft state of a vehicle, even in case that various acceleration sensors which are mounted on a vehicle from an application other than anti-theft are also used as anti-theft.

Also, according to the invention of aspect 21, since expansion permission of the air bag is carried out, not by newly mounting a logic IC and a microcomputer on an air bag ECU, but by utilizing a logic IC and a microcomputer which have been already mounted in a separate device other than the air bag ECU, without making a structure of an air bag apparatus complicated, it becomes possible to configure an electronic safing system at less cost, and it becomes possible to secure reliability of an air bag operation. Further, by applying a separate device which carries out predetermined control unnecessary to be operated on the occasion of carrying out air bag control, it becomes possible to configure an electronic safing system which does not produce delay of processing.

What is claimed is:

1. An anti-theft apparatus comprising:
   an acceleration detection unit mounted on a vehicle for detecting acceleration in a predetermined direction, whose detection result in a first detection sensitivity is used for a predetermined vehicle control;
   a sensitivity switching unit for switching the detection sensitivity of the acceleration detection unit to a second detection sensitivity which is different from the first detection sensitivity when it received an anti-theft instruction for instructing prevention of theft; and
   a theft judgment unit for judging whether or not the vehicle is in a theft state on the basis of the detection result of the acceleration detection unit which was switched to the second detection sensitivity by the sensitivity switching unit;
   wherein the acceleration detection unit is an acceleration sensor which was disposed in a front collision air bag ECU and/or an acceleration sensor which was disposed in a side collision air bag ECU.

2. The anti-theft apparatus according to claim 1, wherein:
   the sensitivity switching unit switches respective detection sensitivities of a plurality of acceleration detection units which are mounted on the vehicle when it receives the anti-theft instruction; and
   the theft judgment unit judges whether or not the vehicle is in the theft state on the basis of respective detection results of the plurality of acceleration detection units.

3. The anti-theft apparatus according to claim 2,
   wherein the theft judgment unit judges that the vehicle is in the theft state, in case that acceleration which was detected by any one of acceleration detection units out of the plurality of acceleration detection units exceeds a predetermined threshold value.

4. The anti-theft apparatus according to claim 2,
   wherein the theft judgment unit judges that the vehicle is in the theft state, in case that respective accelerations which were detected by a plurality of acceleration detection units for detecting acceleration in the same direction out of the plurality of acceleration detection units exceed a predetermined threshold value.

5. The anti-theft apparatus according to claim 1,
   wherein the theft judgment unit judges whether or not the vehicle is in the theft state on the basis of inclination of the vehicle.

6. The anti-theft apparatus according to claim 1,
   wherein the theft judgment unit judges whether or not the vehicle is in the theft state on the basis of vibration of the vehicle.

7. The anti-theft apparatus according to claim 6,
   wherein the theft judgment unit judges whether or not the vehicle is in the theft state on the basis of a detection result of an acceleration detection unit which was disposed at an outer edge part of the vehicle.

8. The anti-theft apparatus according to claim 6,
   wherein the sensitivity switching unit switches each detection sensitivity in such a maimer that the second detection sensitivity of the acceleration detection unit which was disposed at a central part of the vehicle becomes higher than the second detection sensitivity of the acceleration detection unit which was disposed at the outer edge part of the vehicle.

9. The anti-theft apparatus according to claim 1, further comprising
a noise elimination unit for eliminating noise from the detection result of the acceleration detection unit,
wherein the theft judgment unit judges whether or not the vehicle is in the theft state on the basis of the detection result from which noise was eliminated by the noise elimination unit.

10. The anti-theft apparatus according to claim 9,
wherein the noise elimination unit eliminates the noise by switching a cutoff frequency of a filter which is additionally disposed in the acceleration detection unit to a frequency which corresponded to theft judgment of the vehicle.

11. The anti-theft apparatus according to claim 1,
wherein the acceleration detection unit is contained in a predetermined unit together with various devices, and power is supplied thereto from a battery which was mounted on the vehicle or a cell which was contained in the predetermined unit, in the same manner as in the various devices;
the acceleration detection unit includes a power supply control unit for controlling the power source only to the acceleration detection unit in the predetermined unit; and
the theft judgment unit judges whether or not the vehicle is in the theft state on the basis of the detection result of the acceleration detection unit which was controlled so as to supply the power source by the power supply control unit.

12. The anti-theft apparatus according to claim 11,
wherein the power supply control unit controls so as to intermittently supply the power source from the battery or cell to the acceleration detection unit.

13. The anti-theft apparatus according to claim 11,
wherein the power supply control unit controls so as to stop supply of the power source to the acceleration detection unit, in case that a voltage of the battery or cell became a predetermined voltage and below.

14. The anti-theft apparatus according to claim 1, further comprising
a monitoring unit for monitoring a state of the vehicle and for sending out the anti-theft instruction,
wherein the sensitivity switching unit switches detection sensitivity of the acceleration detection unit to detection sensitivity which is available for theft judgment of the vehicle, when it receives the anti-theft instruction which was sent out by the monitoring unit.

15. The anti-theft apparatus according to claim 14,
wherein the monitoring unit monitors an ON-OFF state of an ignition key, and sends out the anti-theft instruction, in case that the ignition key was turned to the OFF state.

16. An anti-theft apparatus comprising:
an acceleration detection unit mounted on a vehicle for detecting acceleration in a predetermined direction, whose detection result in a first detection sensitivity is used for a predetermined vehicle control;
a sensitivity switching unit for switching the detection sensitivity of the acceleration detection unit to a second detection sensitivity which is different from the first detection sensitivity when it received an anti-theft instruction for instructing prevention of theft;
a theft judgment unit for judging whether or not the vehicle is in a theft state on the basis of the detection result of the acceleration detection unit which was switched to the second detection sensitivity by the sensitivity switching unit; and
a noise elimination unit for eliminating noise from the detection result of the acceleration detection unit,
wherein the theft judgment unit judges whether or not the vehicle is in the theft state on the basis of the detection result from which noise was eliminated by the noise elimination unit,
wherein the noise elimination unit eliminates the noise, by periodically integrating the detection result of the acceleration detection unit.

17. An anti-theft apparatus comprising:
an acceleration detection unit mounted on a vehicle for detecting acceleration in a predetermined direction, whose detection result in a first detection sensitivity is used for a predetermined vehicle control;
a sensitivity switching unit for switching the detection sensitivity of the acceleration detection unit to a second detection sensitivity which is different from the first detection sensitivity when it received an anti-theft instruction for instructing prevention of theft;
a theft judgment unit for judging whether or not the vehicle is in a theft state on the basis of the detection result of the acceleration detection unit which was switched to the second detection sensitivity by the sensitivity switching unit; and
a noise elimination unit for eliminating noise from the detection result of the acceleration detection unit,
wherein the theft judgment unit judges whether or not the vehicle is in the theft state on the basis of the detection result from which noise was eliminated by the noise elimination unit,
wherein the noise elimination unit eliminates the noise by switching a cutoff frequency of a filter which is additionally disposed in the acceleration detection unit to a frequency which corresponded to theft judgment of the vehicle, and by periodically integrating the detection result of the acceleration detection unit.

18. An anti-theft method comprising:
an acceleration detection step of detecting acceleration in a predetermined direction, a result of the detection in a first detection sensitivity being used for a predetermined vehicle control;
a sensitivity switching step of switching the detection sensitivity of the acceleration detection step to a second detection sensitivity which is different from the first detection sensitivity when an anti-theft instruction for instructing prevention of theft was received; and
a theft judgment step of judging whether or not the vehicle is in a theft state on the basis of the detection result of the acceleration detection step which was switched to the second detection sensitivity by the sensitivity switching step;
wherein the acceleration detection unit is an acceleration sensor which was disposed in a front collision air bag ECU and/or an acceleration sensor which was disposed in a side collision air bag ECU.

19. An anti-theft program for having a computer executed program on a computer readable medium, comprising:
an acceleration detection step of detecting acceleration in a predetermined direction, a result of the detection in a first detection sensitivity being used for a predetermined vehicle control;
a sensitivity switching step of switching the detection sensitivity of the acceleration detection step to a second detection sensitivity which is different from the first detection sensitivity when an anti-theft instruction for instructing prevention of theft was received; and a theft judgment step of judging whether or not the vehicle is in a theft state on the basis of the detection result of the acceleration detection step which was switched to the second detection sensitivity by the sensitivity switching step;
wherein the acceleration detection unit is an acceleration sensor which was disposed in a front collision air bag ECU andlor an acceleration sensor which was disposed in a side collision air bag ECU.

20. An anti-theft apparatus mounted on a vehicle that includes an acceleration detection unit for detecting acceleration in a predetermined direction, the anti-theft apparatus comprising a theft judgment unit for judging whether or not the vehicle is in a theft state on the basis of the detection result of the acceleration detection unit,
wherein the acceleration detection unit includes a sensitivity switching unit for switching the detection sensitivity of the acceleration detection unit to a second detection sensitivity which is different from the first detection sensitivity and the acceleration detection unit is an acceleration sensor which was disposed in a front collision air bag ECU and/or an acceleration sensor which was disposed in a side collision air bag ECU.

* * * * *